(12) United States Patent
Chuo et al.

(10) Patent No.: US 10,746,844 B2
(45) Date of Patent: Aug. 18, 2020

(54) LOW-POWER, LONG-RANGE RF LOCALIZATION SYSTEM AND METHOD

(71) Applicant: THE REGENTS OF THE UNIVERSITY OF MICHIGAN, Ann Arbor, MI (US)

(72) Inventors: Li-Xuan Chuo, Ann Arbor, MI (US); Hun-Seok Kim, Ann Arbor, MI (US); David T. Blaauw, Ann Arbor, MI (US); Dennis Sylvester, Ann Arbor, MI (US); Mingyu Yang, Ann Arbor, MI (US)

(73) Assignee: THE REGENTS OF THE UNIVERSITY OF MICHIGAN, Ann Arbor, MI (US)

( * ) Notice: Subject to any disclaimer, the term of this patent is extended or adjusted under 35 U.S.C. 154(b) by 0 days.

(21) Appl. No.: 16/654,547

(22) Filed: Oct. 16, 2019

(65) Prior Publication Data

US 2020/0116817 A1 Apr. 16, 2020

Related U.S. Application Data

(60) Provisional application No. 62/746,010, filed on Oct. 16, 2018.

(51) Int. Cl.
*H04W 24/00* (2009.01)
*G01S 5/02* (2010.01)
*H04L 27/26* (2006.01)
*G01S 11/08* (2006.01)
*H04L 5/14* (2006.01)
*H04W 64/00* (2009.01)

(52) U.S. Cl.
CPC .......... *G01S 5/0273* (2013.01); *G01S 5/0226* (2013.01); *G01S 11/08* (2013.01); *H04L 5/143* (2013.01); *H04L 27/2627* (2013.01); *H04W 64/006* (2013.01)

(58) Field of Classification Search
None
See application file for complete search history.

(56) References Cited

U.S. PATENT DOCUMENTS 10,051,423 B1 * 8/2018 Feinmesser ........... H04W 4/023
10,371,782 B1 * 8/2019 Taylor, Jr. ............... G01S 1/045
(Continued)

*Primary Examiner* — Khalid W Shaheed
(74) *Attorney, Agent, or Firm* — Harness, Dickey & Pierce, P.L.C.

(57) ABSTRACT

A system is presented for non-line-of-sight localization between RF enabled devices. A transmitting node is configured to transmit an RF ranging signal at a first carrier frequency, where the RF ranging signal is modulated with a symbol. The reflecting node is configured to receive the RF ranging signal and further operates to convert the RF ranging signal to a second carrier frequency and retransmit the converted ranging signal while simultaneously receiving the RF ranging signal. The localizing node is configured to receive the converted ranging signal from the reflecting node. The localizing node operates to identify, in frequency domain, the symbol in the converted ranging signal and compute a distance between the reflecting node and the localizing node based in part on the identified symbol in the converted ranging signal. The transmitting node and the localizing node may be on the same or different devices.

13 Claims, 17 Drawing Sheets

(56) References Cited

U.S. PATENT DOCUMENTS

2004/0102191 A1\* 5/2004 Pewitt ................ H04B 7/18504
455/431
2019/0098507 A1\* 3/2019 Yang ................... H04L 63/1483

\* cited by examiner

LOW-POWER, LONG-RANGE RF LOCALIZATION SYSTEM AND METHOD

CROSS-REFERENCE TO RELATED APPLICATIONS

This application claims the benefit of U.S. Provisional Application No. 62/746,010, filed on Oct. 16, 2018. The entire disclosure of the above application is incorporated herein by reference.

GOVERNMENT CLAUSE

This invention was made with government support under Grant No. 70NANB17H163 awarded by the National Institute of Standards and Technology. The government has certain rights in the invention.

FIELD

The present disclosure relates to low-power, long-range RF localization system.

BACKGROUND

Low-range low-power non-line-of-sight (NLOS) indoor localization can enable a host of location-aware Internet-of-Things (IoT) applications. Indoor navigation of public safety officials inside a building is a primary example. The localization tag built in wearable devices would significantly enhance the effectiveness of emergency evacuation, search and rescue operations. Intelligent warehouses and factories can be realized by tracking accurate locations of pallets, equipment robots and people in real-time to eliminate potential safety hazards while maximizing logistics efficiency. In hospitals, tracking of equipment, patients, and personnel can identify and eliminate infectious vectors, addressing a major health care issue. Ubiquitous localization-ready wireless tags to enable real-time tracking and logging of medical personnel/equipment interaction with patients is envisioned.

A mobile tag for everyday IoT applications must be small, low power, low cost, and rapidly deployable without heavy infrastructure investment. This disclosure targets a stringent power budget of <100 µW in average (duty-cycled) and <<100 µW peak power to fully integrate the solution in a centimeter-scale wearable tag. The localization accuracy requirement for a wide class of IoT applications is in the decimeter (10 cm) order and it must be functional in large (up to 100 m per dimension) indoor environments where NLOS scenarios are dominant with multipath-rich RF propagation. To date, there are few existing solutions that adequately address this set of challenging specifications which is critical to a wide set of localization based applications. Low-cost global positioning system (GPS) receivers, for example, cannot establish enough SNR to achieve better than several meters accuracy in indoor settings. WiFi or Bluetooth based indoor localization solutions are available today but their operating range is quite limited (<20 m) and their accuracy is in the order of a few meters that is insufficient to satisfy stringent public safety localization application requirements.

This disclosure introduces a new approach in RF localization that utilizes a frequency-shifting active reflector on a node that echoes the orthogonal frequency division multiplexing (OFDM) ranging signal generated from an anchor. A frequency conversion based full duplex approach enhances the localization range and accuracy beyond the level achievable by conventional narrowband RF localization systems.

This section provides background information related to the present disclosure which is not necessarily prior art.

SUMMARY

This section provides a general summary of the disclosure, and is not a comprehensive disclosure of its full scope or all of its features.

A system is presented for non-line-of-sight localization between RF enabled devices. Conceptually, the system is comprised of a transmitting node, a reflecting node and a localizing node. The transmitting node is configured to transmit an RF ranging signal at a first carrier frequency across a wireless medium, where the RF ranging signal is modulated with a symbol. The reflecting node is configured to receive the RF ranging signal from the transmitting node, where the reflecting node operates to convert the RF ranging signal to a second carrier frequency and retransmit the converted ranging signal across the wireless medium while simultaneously receiving the RF ranging signal, such that the second carrier frequency differs from the first carrier frequency. The localizing node is configured to receive the converted ranging signal from the reflecting node. The localizing node operates to identify, in frequency domain, the symbol in the converted ranging signal and compute a distance between the reflecting node and the localizing node based in part on the identified symbol in the converted ranging signal.

In one embodiment, the transmitting node and the localizing node reside on the same device. In this embodiment, a first transmitting device is configured to transmit an RF ranging signal at a first carrier frequency across a wireless medium, where the RF ranging signal is modulated with a symbol; and a reflecting device is configured to receive the RF ranging signal from the first transmitting device, wherein the reflecting device operates to convert the RF ranging signal to a first retransmit carrier frequency and retransmit the converted ranging signal across the wireless medium while simultaneously receiving the RF ranging signal, such that the first retransmit carrier frequency differs from the first carrier frequency. The first transmitting device is further configured to receive the converted ranging signal from the reflecting device and compute a distance between the reflecting device and the first transmitting device by estimating time-of-flight of the ranging signal in frequency domain based in part on the symbol in the converted ranging signal.

In another embodiment, the transmitting node and the localizing node reside on different devices. In this embodiment, a transmitting device is configured to transmit an RF ranging signal at a first carrier frequency and a second RF ranging signal at a second carrier frequency, where the RF ranging signals are modulated with a symbol. The system may include three or more reflecting devices. For example, a first reflecting device is configured to receive the RF ranging signal from the transmitting device at the first carrier frequency, and further operates to convert the RF ranging signal to a first retransmit carrier frequency and retransmit the converted ranging signal across the wireless medium. Likewise, a second reflecting device is configured to receive the RF ranging signal from the transmitting device at the first carrier frequency, and further operates to convert the RF ranging signal to a second retransmit carrier frequency and retransmit the converted ranging signal across the wireless medium; and a third reflecting device is configured to receive the RF ranging signal from the transmitting device at the first carrier frequency, and further operates to convert the RF ranging signal to a third retransmit carrier frequency and retransmit the converted ranging signal across the wireless medium. A localizing device is configured to receive the RF ranging signal directly from the transmitting device at the second carrier frequency and the converted ranging signal from the first, second and third reflecting devices at the first, second and third retransmit carrier frequencies. The localizing device determines its position from the RF ranging signal and the converted ranging signals using multilateration.

In some embodiments, the transmitting node modulates the RF ranging signal using orthogonal frequency-division multiplexing (OFDM), such that the symbol is further defined as OFDM symbol. The localizing node may also identifies the symbol in the reflected ranging signal by measuring impulse response of the converted ranging signal in the frequency domain.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 6:
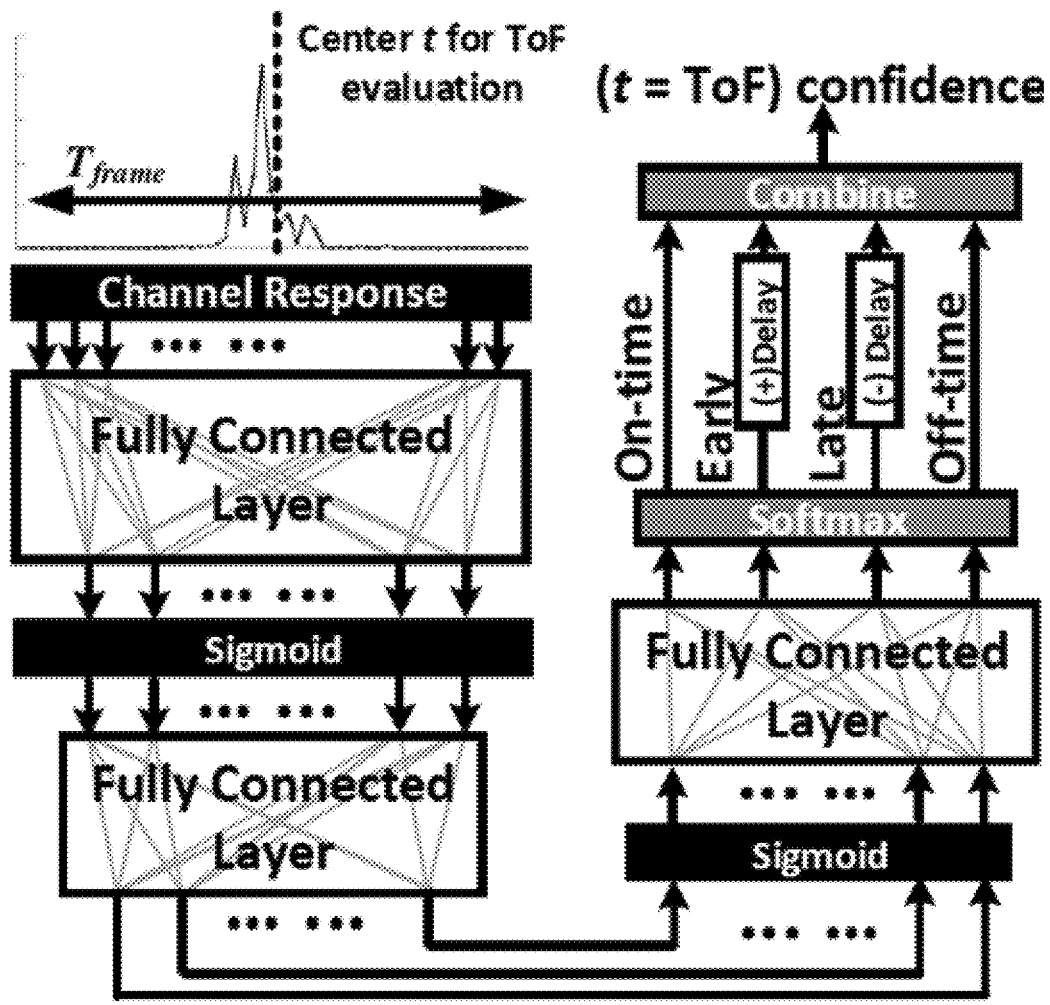

FIG. 6 is a diagram depicting an example feedforward neural network structure for the proposed localization system, where input vector length $T_{frame}$=134 ns (107 samples when BW=80 MHz and 10× interpolation are used), the first and second hidden layer have 48 and 16 neurons, respectively, and $T_{offset}$=20 ns for early and late neurons.

Figure 7:
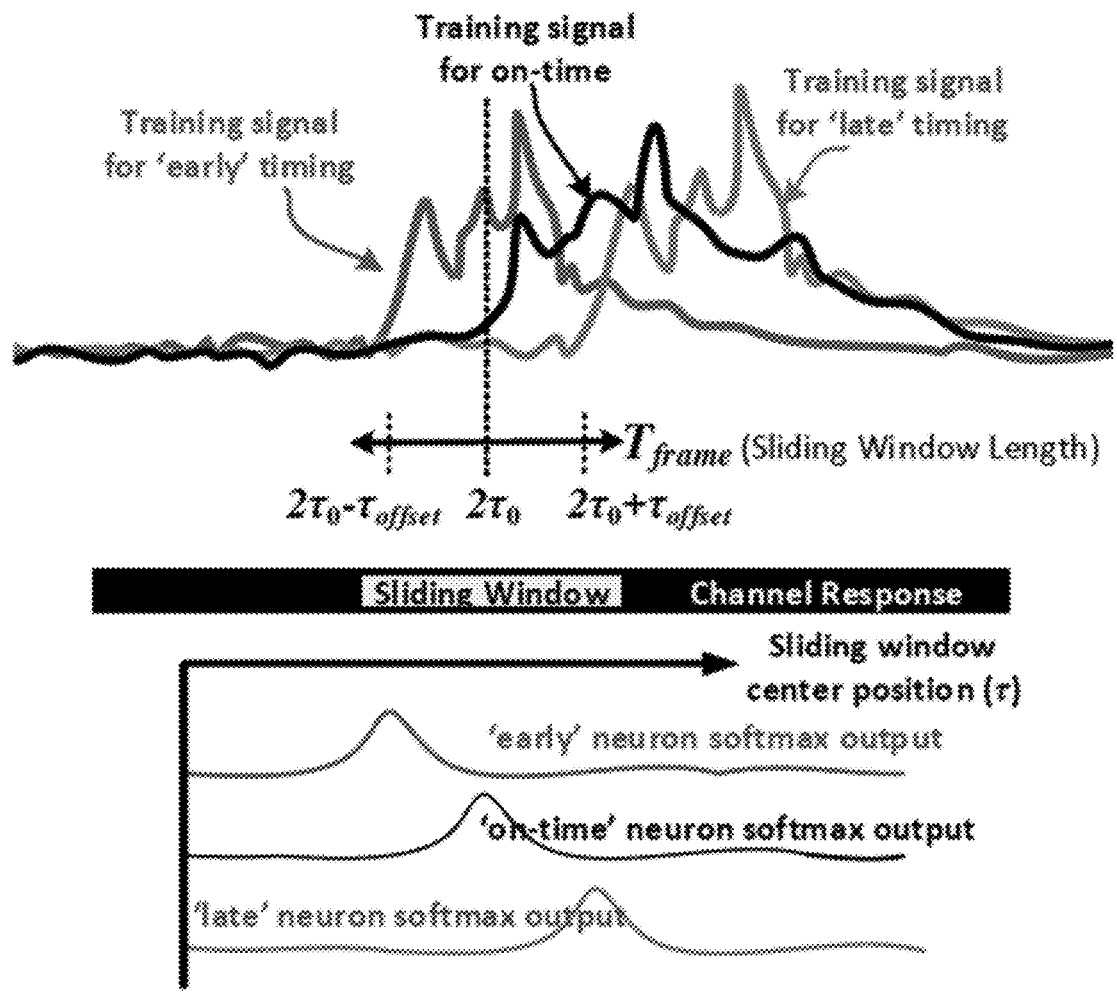

FIG. 7 is a diagram illustrating a proposed bootstrap aggregating method.

Figure 8A:
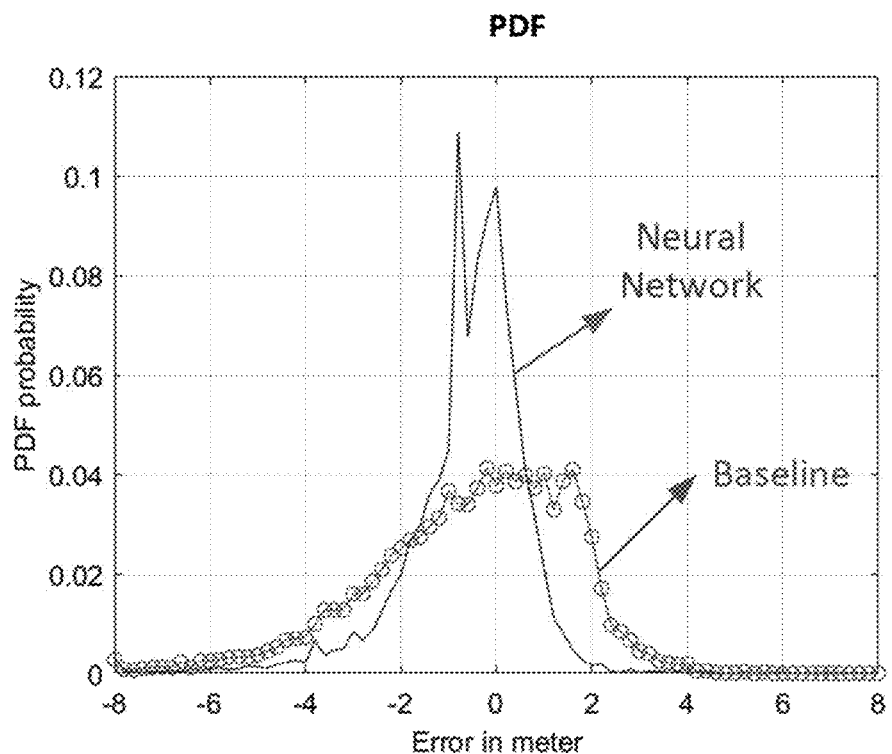

FIG. 8A is a graph showing ranging accuracy simulated in Matlab with 50 ns delay spread multipath channels; probability density function (PDF) of errors from the proposed neural network method vs. baseline algorithm.

Figure 8B:
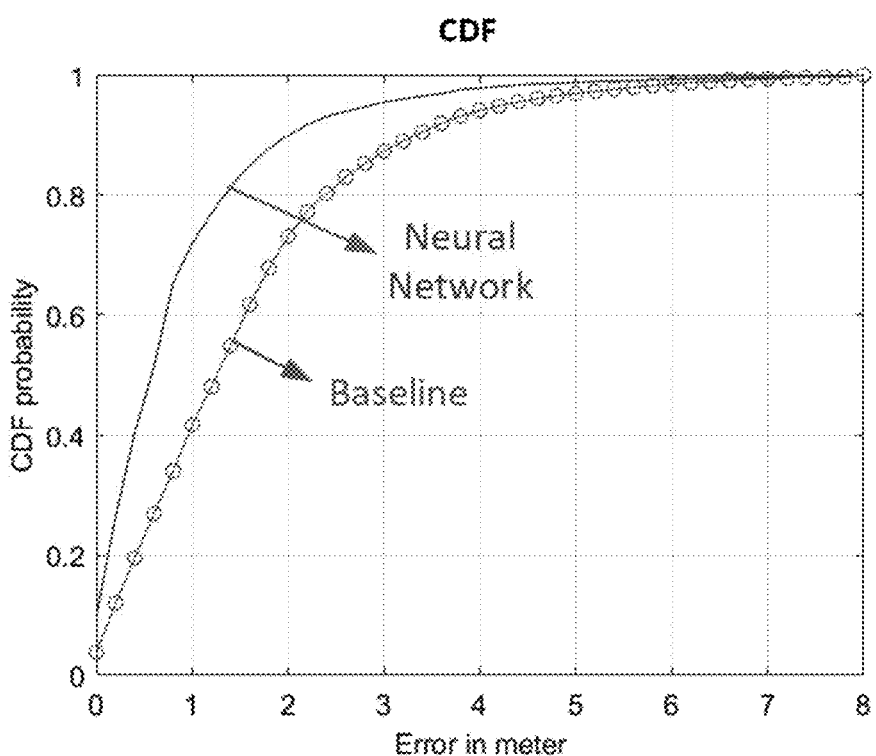

FIG. 8B is a graph showing ranging accuracy simulated in Matlab with 50 ns delay spread multipath channels; cumulative density function (CDF) of errors, neural network vs. baseline algorithm.

Figure 8C:
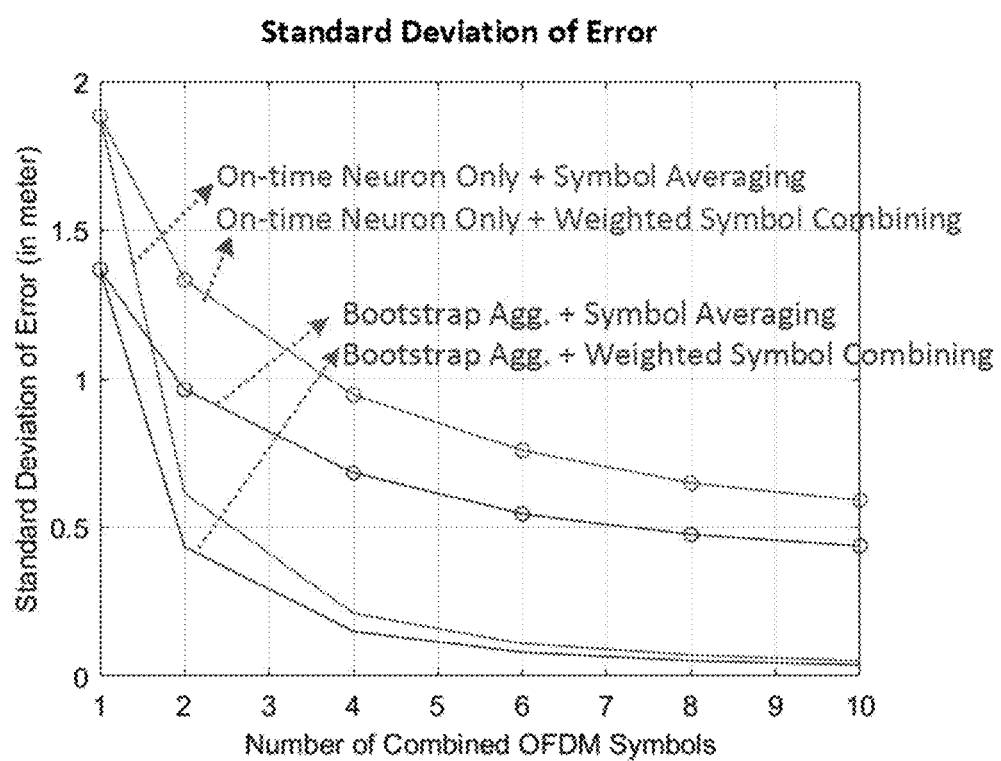

FIG. 8C is a graph showing ranging accuracy simulated in Matlab with 50 ns delay spread multipath channels; standard deviation of errors from multiple OFDM symbol combining: bootstrap aggregation vs. on-time neuron only, and averaging vs. confidence weighted symbol combining.

Figure 9A:
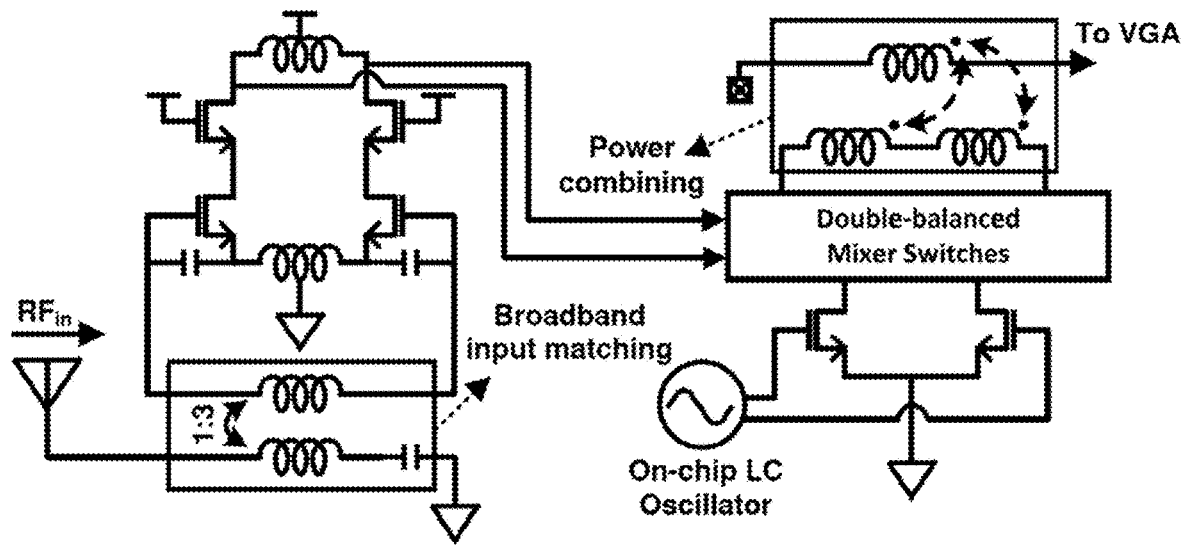

FIG. 9A is a schematic of an example LNA and mixer circuit for a reflecting node.

Figure 9B:
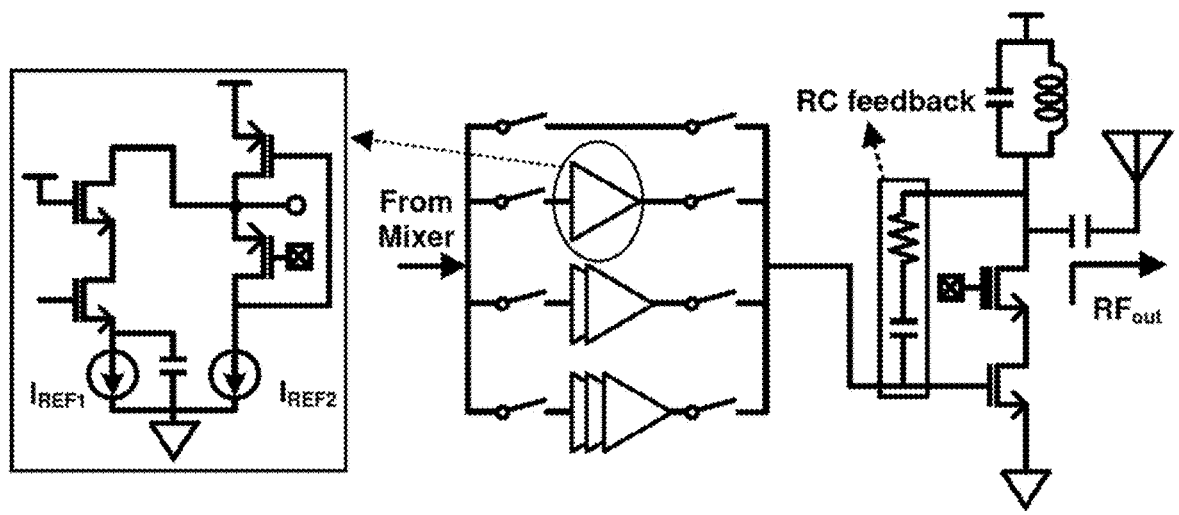

FIG. 9B is a schematic of an example VGA and PA circuit for a reflecting node.

Figure 10:
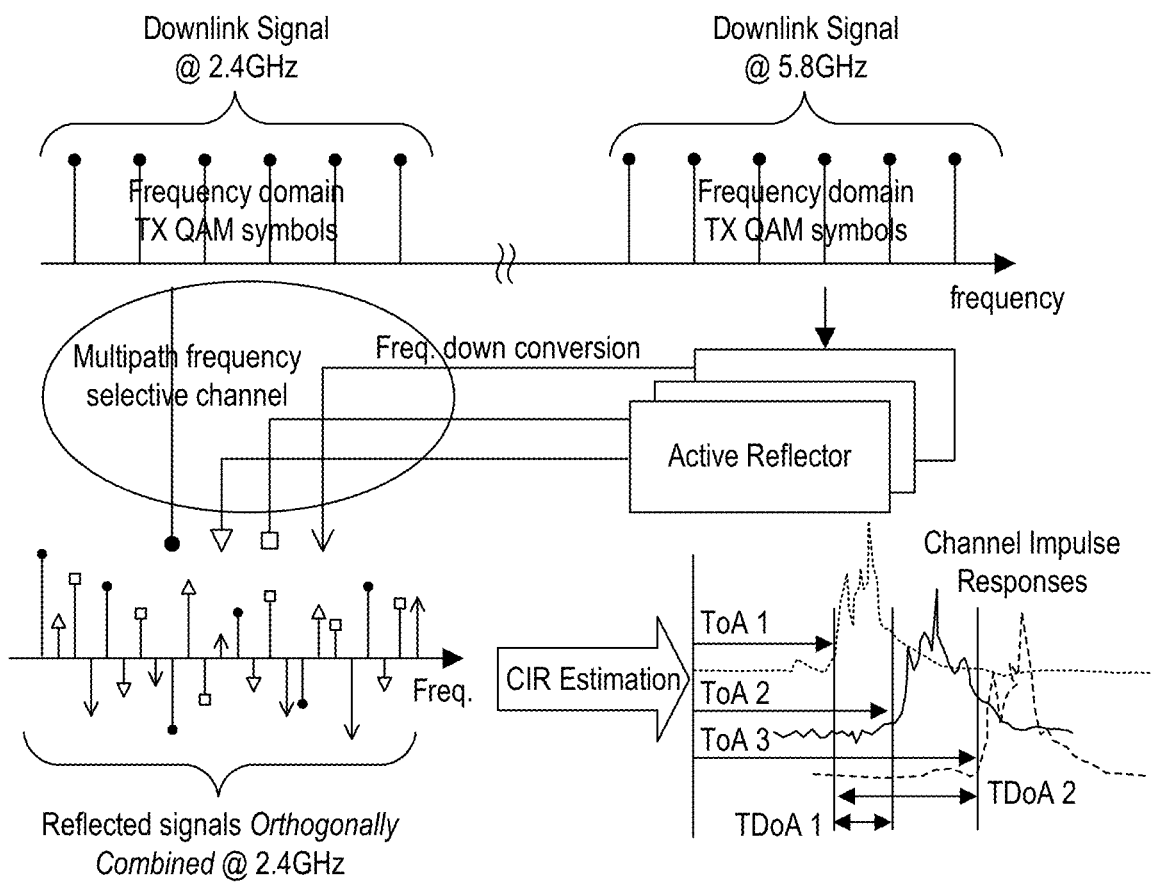

FIG. 10 is a diagram illustrating the operating principle for the second embodiment of the proposed localization system.

Figure 11:
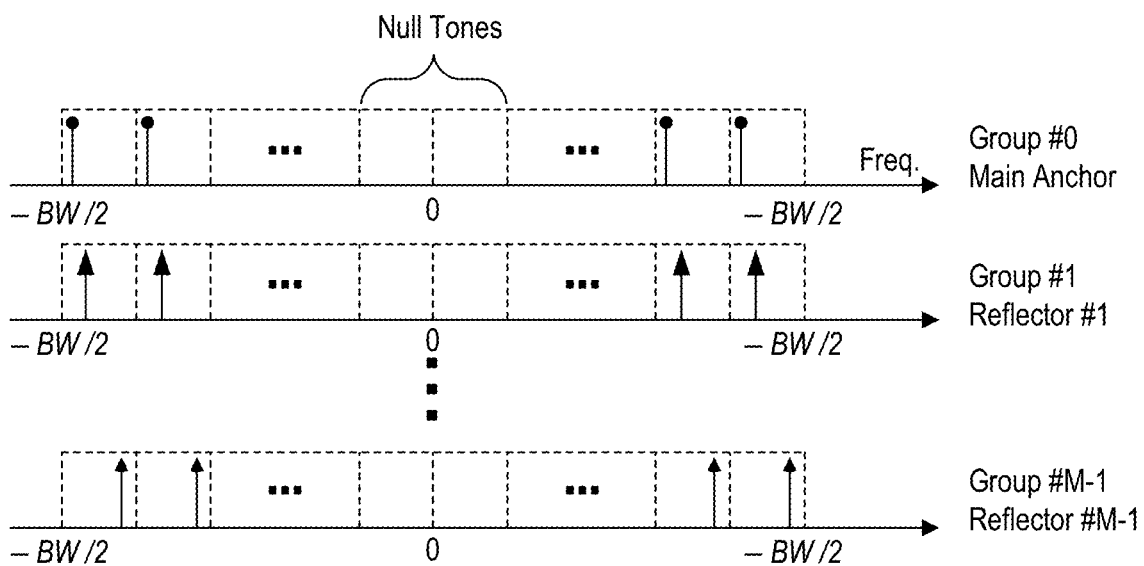

FIG. 11 is a diagram showing an example interleaved OFDMA subcarrier allocation scheme.

Figure 12:
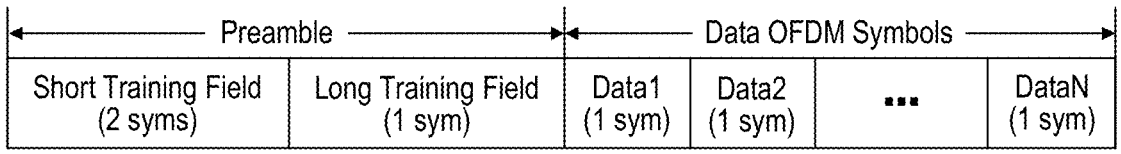

FIG. 12 is a diagram showing an example OFDMA packet structure.

Figure 13:
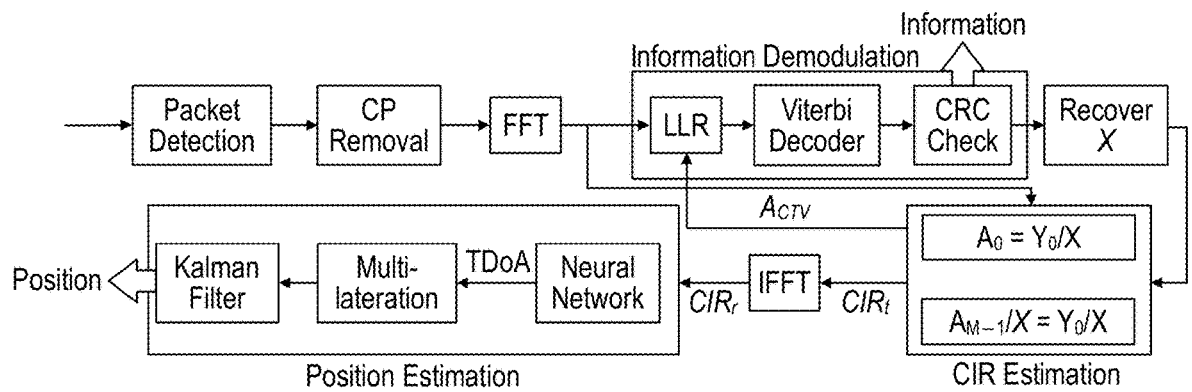

FIG. 13 is a block diagram showing the baseband signal processing datapath for localization and simultaneous communication on the tag device.

Figure 14:
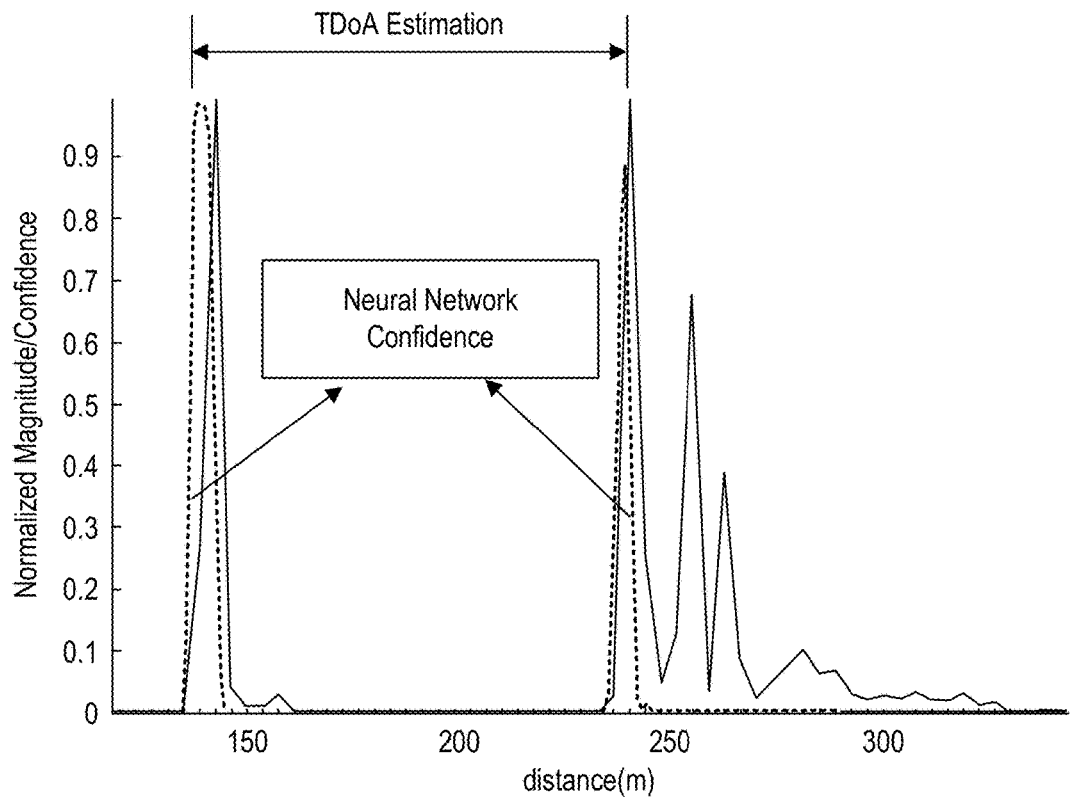

FIG. 14 is a graph showing the constructed CIRs for the main anchor (left) and reflector (right) together with their neural network confidence output.

Figure 15:
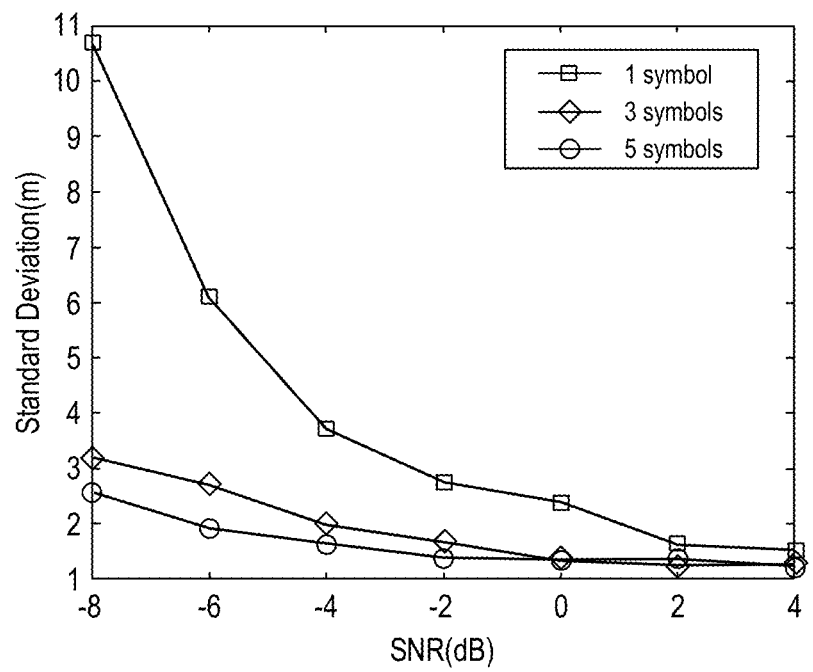

FIG. 15 is a graph showing 1D ranging error standard deviation vs. SNR for difference numbers of pre-TDoA combined symbols (no post-TDoA combining).

Figure 16:
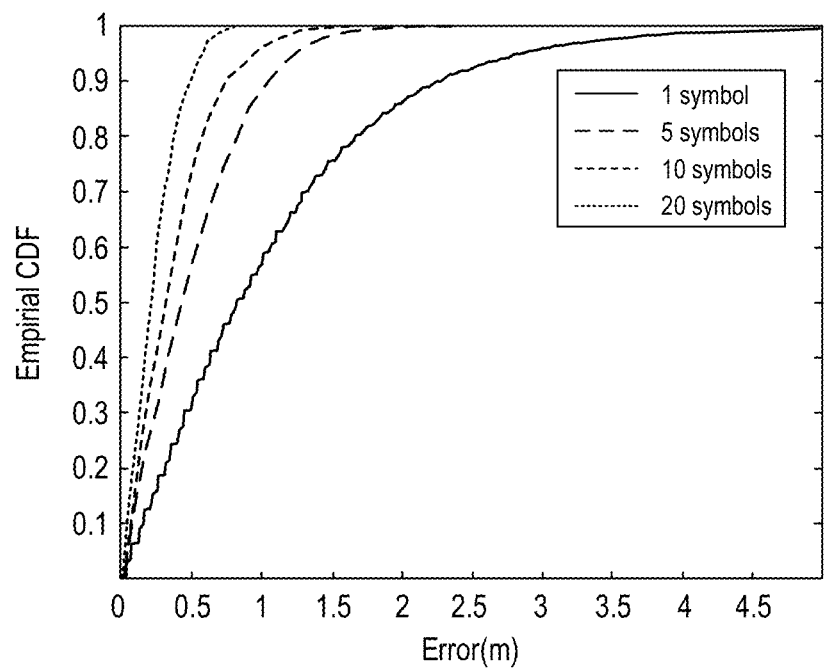

FIG. 16 is a graph showing CDF of 1D ranging error for difference numbers of post-TDoA combined OFDMA symbols.

Figure 17:
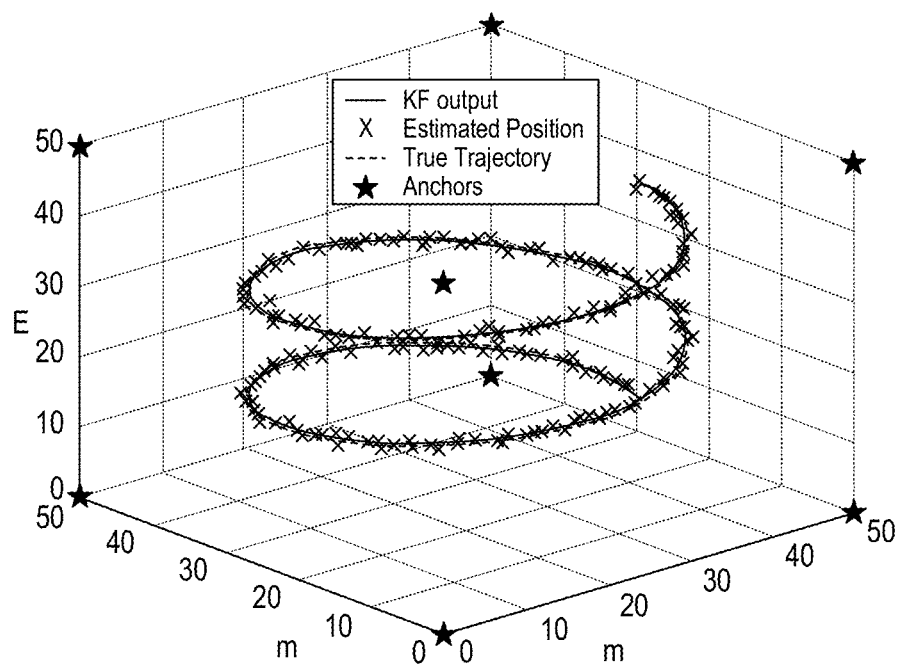

FIG. 17 is a graph showing # D localization simulations in multipath NLOS channels with post-TDoA symbol combining and Kalman filtering.

Figure 18:
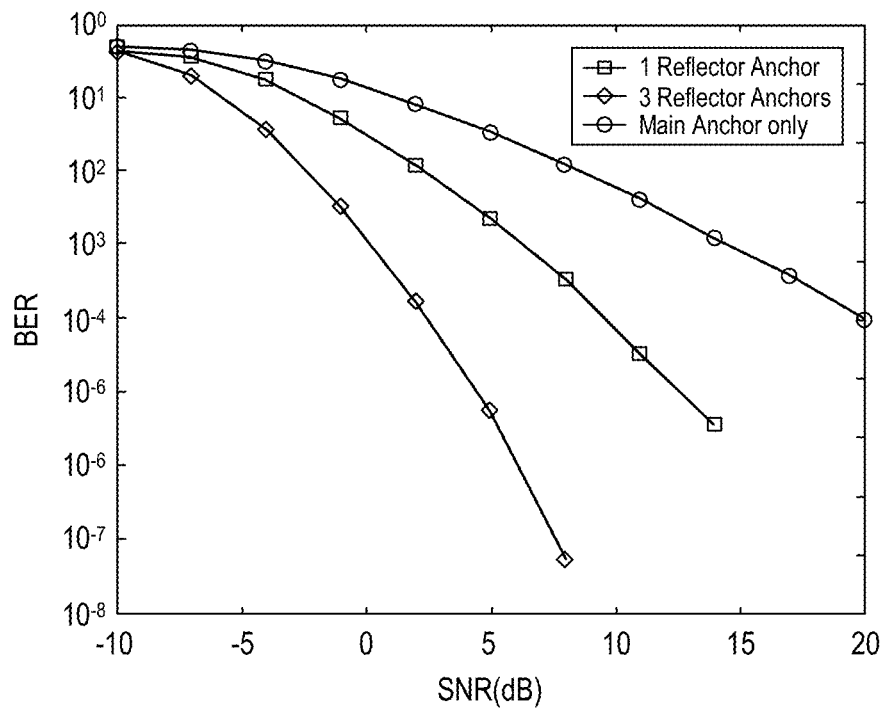

FIG. 18 is a graph showing data communications BER vs. SNR for increasing number of anchors forming distributed MISO systems.

Figure 19:
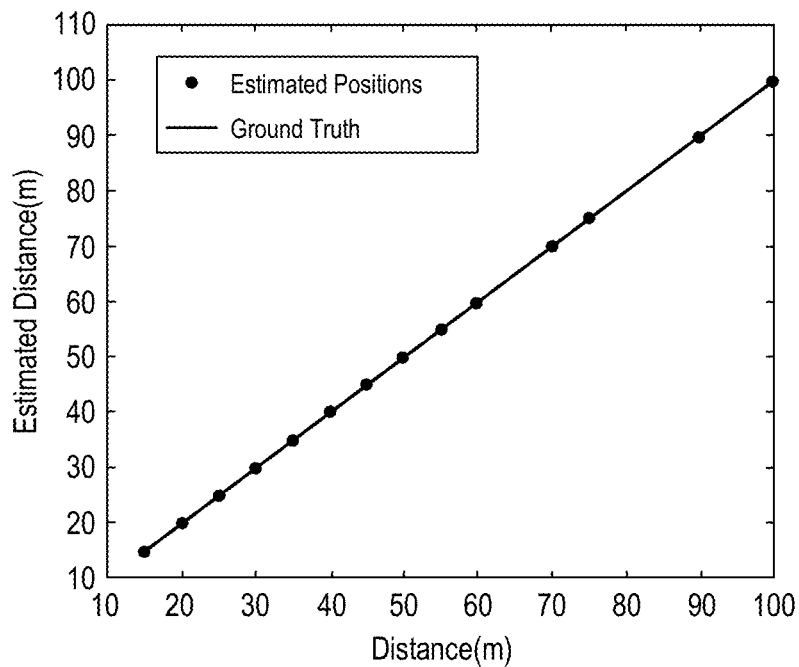

FIG. 19 is a graph showing 1D ranging in multipath-rich university buildings.

Figure 20:
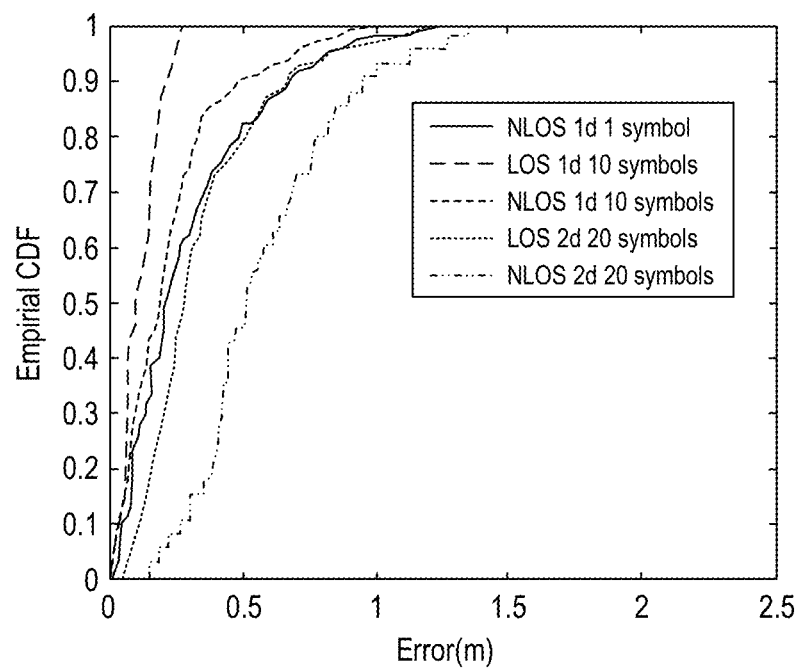

FIG. 20 is a graph showing CDF of 1D/2D position error in meter evaluated in multipath-rich university buildings with LOS/NLOS settings.

Figure 21:
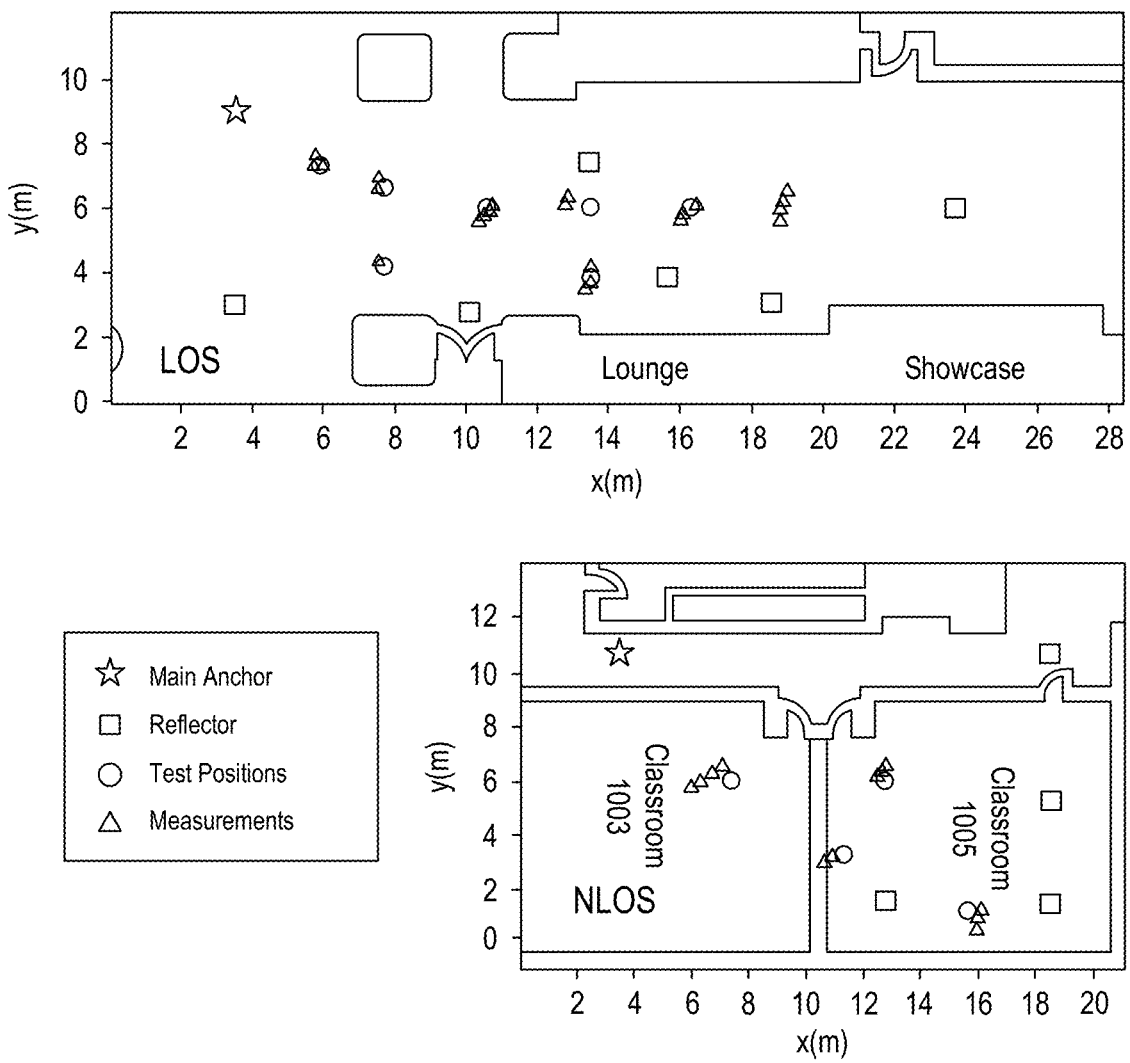

FIG. 21 is a diagram depicting 2D localization evaluation in a multipath-rich university building with LOS and NLOS scenarios where four anchors were used per each tag location fix.

Corresponding reference numerals indicate corresponding parts throughout the several views of the drawings.

DETAILED DESCRIPTION

Example embodiments will now be described more fully with reference to the accompanying drawings.

A conventional time-of-flight (ToF) ranging method is briefly introduced herein. The one-dimensional (1D) distance estimation process between the anchor and the tag is denoted by ranging. Higher dimensional localization is conducted by combining ID ranging results from multiple anchors through multilateration process discussed herein.

Time-of-flight or time-of-arrival (ToA) based ranging techniques rely on measurements of signal travel time between an anchor and a tag with a goal to distinguish the shortest direct path arrival time from any subsequent (NLOS) multipaths. When sufficiently wide signal bandwidth is given, the ToF/ToA techniques can be determined with high accuracy and since direct path always precedes the NLOS multipath, the two can be distinguished. One approach is to use an impulse-radio ultra wideband (UWB) system where very short pulses (e.g., on order of a nano second or less) are transmitted and the arrival time of each pulse is estimated at the receiver to obtain the ToF of the transmitted signal. The bandwidth of an UWB pulse is inversely proportional to the pulse width and narrower pulses are preferred to obtain finer time resolution in ToF/ToA estimation. Since an RF signal travels at the speed of light, the time of flight directly maps to the distance with the relationship that 1 ns in ToF is equivalent to 30 cm in distance. The distance of the direct path in NLOS multipath-rich environments can be resolved by analyzing the first arrival signal time, not the strongest. One of key challenges to achieve decimeter level accuracy in ToF/ToA based ranging is to realize sub-nano second time resolution. In a conventional approach, where the signal is sampled and then processed in the digital domain, this would require an ADC with >1G samples per second. However, such high-speed ADCs are extremely power hungry. Furthermore, the cost increases exponentially with the sampling rate beyond 10 MHz. Operating ADC at or above Nyquist sampling rate (>1 GHz for UWB signals) is, therefore, impractical for many low-power low-cost wireless sensor node localization applications.

While ultra-wideband is beneficial to obtain the pulse arrival time in finer resolution, the wider bandwidth is prone to interference from different frequency bands. Relatively strong interference signals that might be present anywhere in the ultra-wide bandwidth can saturate UWB receiver amplifiers. A highly linear RF circuit for ultra-wideband is very power demanding, whereas the limited linearity of the amplifier could constraint the UWB receiver operability in the presence of in-band interferers. Moreover, due to its ultra-wide bandwidth, operating at a higher carrier frequency (typically >4 GHz) is inevitable where signals experience worse pathloss and wall penetration loss, lowering its signal-to-noise ratio (SNR). According to the free-space Friis equation, 4 GHz carrier suffers 13 dB worse pathloss than a 900 MHz carrier, which translates to more than 4× decrease in distance (6 dB SNR corresponds to 2× distance).

Figure 1:
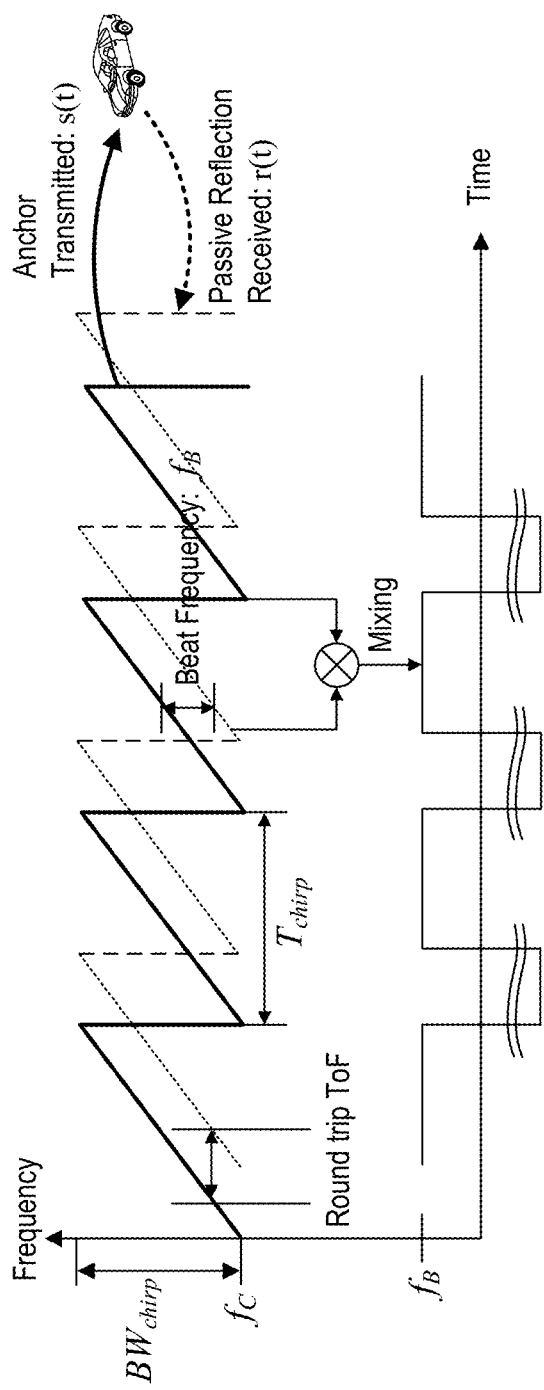
FIG. 1 is a diagram showing the operating principle of the FMCW radar; the time of flight (ToF) is proportional to the beat frequency $f_B$.

Frequency-modulated continuous-wave (FMCW) based ranging is a method widely used in radar systems to estimate ToF in the frequency domain. In conventional FMCW systems, the radar (i.e., anchor) transmits frequency-modulated chirp signals. The FMCW radar transmit signal, (s)t, is represented by equation (1) where $f_c$ is the carrier frequency, $s_f$ is the frequency chirp slope, and $T_{chirp}$ is the chirp duration. The chirp bandwidth is defined as $BW_{chirp}=s_fT_{chirp}$. The operating principle of the FMCW radar is illustrated in FIG. 1.

$$s(t) = e^{j2\pi\left(f_c + \frac{s_f t}{2}\right)t} \quad (1)$$

The FMCW radar estimates the distance to an object by analyzing the received signal r(t) that is passively reflected by an object. The passively reflected signal r(t) is a time-delayed (due to round-trip ToF) version of the transmitted signal. The r(t) can be denoted by h(t)*s(t)+n(t), where * stands for convolution, n(t) is the noise inducted at the receiver, and h(t) is the round-trip channel impulse response in time domain.

$$\text{Roundtrip ToF}=2d/c=2\tau_0 \quad (2)$$

Note that the round-trip ToF and the ranging distance have the relationship above in equation (2), where $\tau_0$ is the one way time-of-flight, c is the speed of light, and d is the distance to an object.

With reference to FIG. 1, assume $(h)t=\delta(t-2\tau_0)$ (i.e., non-multi-path channel without delay spread). When the received reflection signal is mixed with the transmitted chirp signal $r^*(t)s(t)$, a constant beat frequency, $f_B$ is observed in the down-converted (and low-pass filtered) baseband signal as in equation (3) as follows:

$$LPF\{r^*(t)s(t)\}=e^{j2\pi f_B t}+\tilde{n}(t), f_B=s_f d/c\tau_0 \quad (3)$$

This constant beat frequency indicates the distance d to an object, as it is proportional to the round-trip ToF of the signal.

This disclosure proposes a localization system that uses a full-duplex active RF reflector to estimate the range based on the round-trip ToF in frequency domain. In an example embodiment, the anchor transmits a 2.4 GHz carrier frequency ranging signal to the tag, which concurrently (in a full duplex fashion) relays the ranging signal back to the anchor with carrier frequency down-conversion to 900 MHz. While reference is made to particular frequencies, it is readily understood that the proposed ranging method is applicable to other frequencies as well.

Unlike a conventional RF radar, which relies on passive reflections, this active reflection with the frequency shifting approach allows full-duplex tag design without incurring complexity overhead to cancel the self-interference in the same frequency. Realizing a full-duplex system with the same transmit and receive frequency is technically challenging. The active reflector tag design has dramatically reduced complexity by intentionally shifting the reflection carrier frequency at the tag for full-duplex operation.

Figure 2:
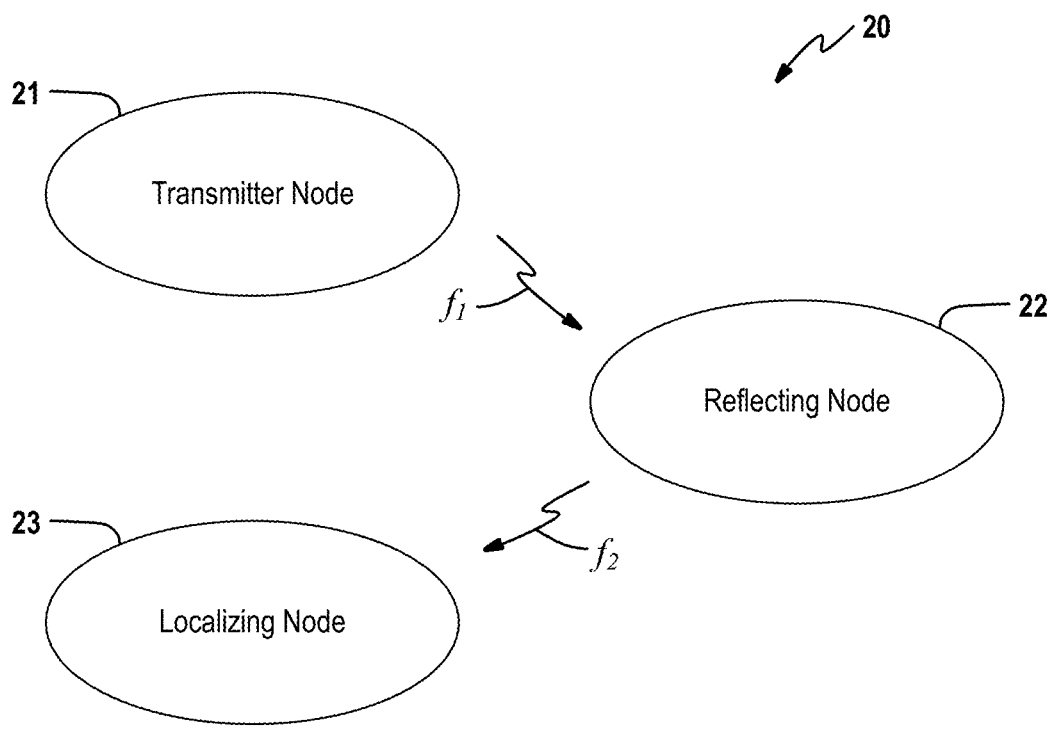
FIG. 2 is a diagram depicting an overview of a proposed system for non-line-of-sight localization.

FIG. 2 provides an overview of the proposed system 20 for non-line-of-sight localization. The system 20 includes at least one transmitting node 21, at least one reflecting node 22, and at least one localizing node 23. It is understood that the transmitting node and localizing nodes may be implemented on the same or different devices as described below.

Briefly, the transmitting node 21 is configured to transmit an RF ranging signal at a first carrier frequency across a wireless medium. The RF ranging signal is modulated with a tag, for example a symbol. The reflecting node 22 is configured to receive the RF ranging signal from the transmitting node. The reflecting node 22 operates to convert the RF ranging signal to a second carrier frequency and retransmits the converted ranging signal across the wireless medium, such that the second carrier frequency differs from the first carrier frequency. The carrier frequency is preferably downconverted at the reflecting node 22 but could be upconverted in some embodiments. The localizing node 23 is configured to receive the converted ranging signal from the reflecting node. The localizing node 23 in turn identifies the tag in the converted ranging signal (in the frequency domain) and, based in part on the tag, computes a distance between the reflecting node and the localizing node. More detailed description of these functions are set forth below.

Figure 3A:
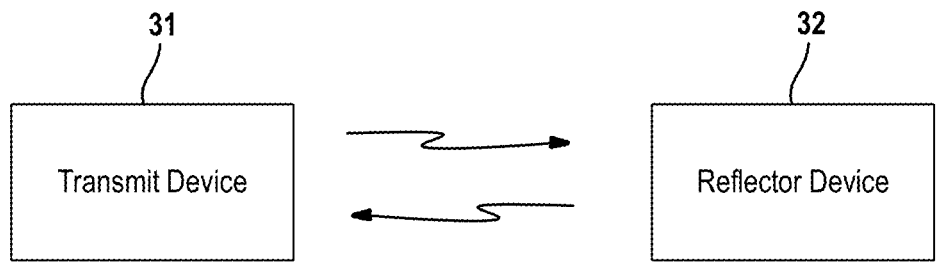
FIG. 3A is a diagram depicting a first embodiment of the proposed localization system.

In a first embodiment, the transmitting node and the localizing node reside on the same device. With reference to FIG. 3A, the localizing system includes a transmit device 31 and a reflecting device 32. The transmit device 31 transmits the RF ranging signal across a wireless medium. The reflecting device 32 in turn receive the RF ranging signal from the transmit device 31 and converts the RF ranging signal to a second carrier frequency before retransmitting the converted ranging signal across the wireless medium, such that the second carrier frequency differs from the first carrier frequency. In this embodiment, the first transmit device 31 receives the converted ranging signal from the reflecting device 32 and computes a distance between the reflecting device and the transmit device.

The main advantages of the proposed localization are summarized as follows: 1) increased range due to signal amplification at the tag IC; 2) distinction between the tag reflection and non-targets passive reflection; 3) flexibility of the ranging signal scheme, allowing for application-specific waveform design; 4) simplicity in the RF and analog tag IC design without discrete time sampling or DSP circuitry, resulting in low power, smaller chip area, low cost, and deterministic delay; and 5) lower signal pathloss and better wall penetration for the returning path from the tag because of the lowered (from 2.4 GHz to 900 MHz) carrier frequency.

Figure 4:
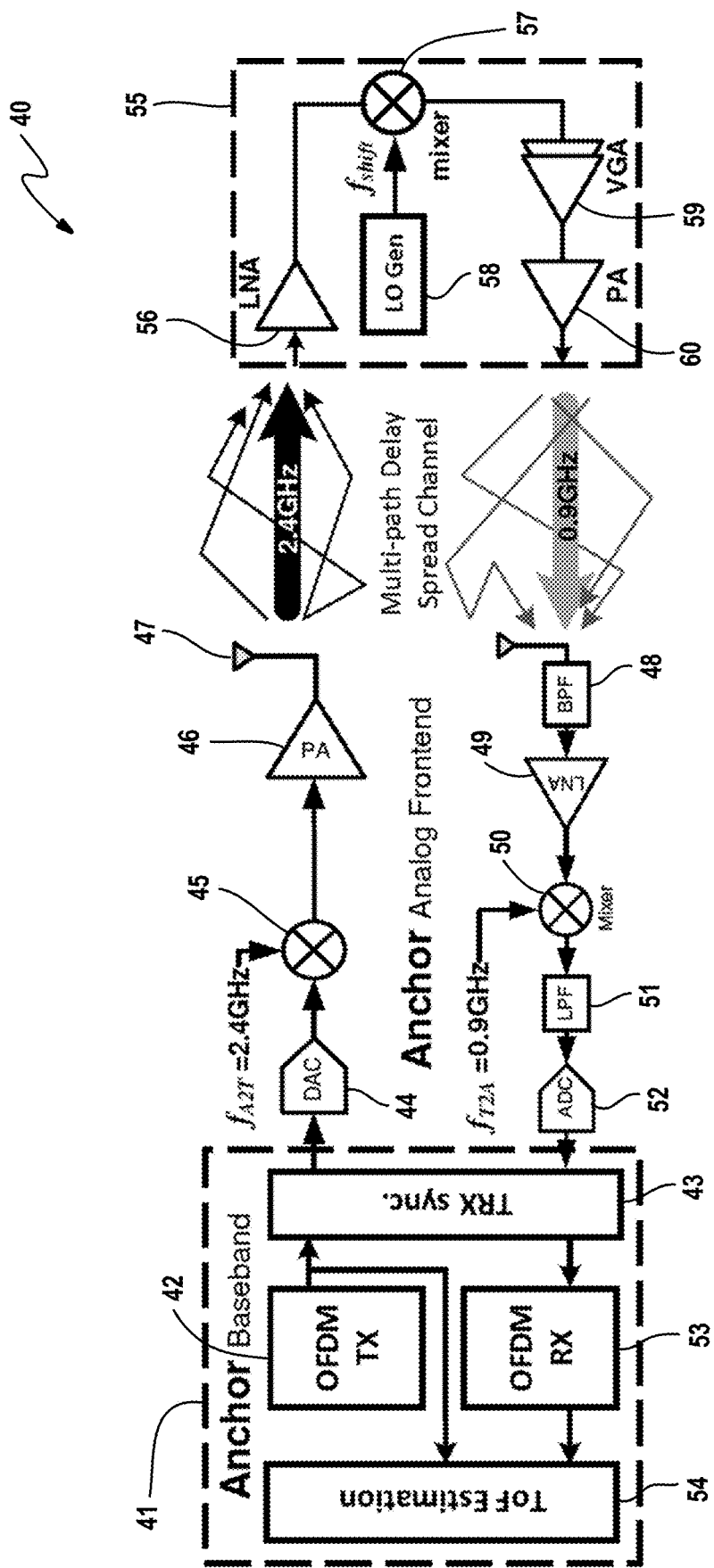
FIG. 4 is a block diagram of an example implementation of the first embodiment of the localization system, where the channel impulse response is estimated in frequency domain using OFDM waveforms.

FIG. 4 further depicts an example implementation for the first embodiment of the localization system 40. In this example implementation, the anchor device 41 serves as both the transmitting node and the localizing node. On the transmit path, the anchor device 41 includes an OFDM transmitter 42, a transmit synchronizer 43, a digital-to-analog converter 44, a mixer 45, a power amplifier 46 and an antenna 47. On the receive path, the anchor device 41 includes a bandpass filter 48, a low noise amplifier 49, a mixer 50, a low pass filter 51, an analog-to-digital converter 52, the transmit synchronizer 43, an OFDM receiver 53 and time-of-flight estimator 54. In this example, the anchor transmits a ≤80 MHz bandwidth ranging signal at 2.4 GHz and encodes the ranging signal with an OFDM symbol using orthogonal frequency-division multiplexing (OFDM). This ranging signal is intended to be illustrative and non-limiting.

The reflecting (or tag) device 55 receives the RF ranging signal, shifts the carrier frequency to a different frequency, and echoes it with a deterministic delay. The frequency conversion is preferably performed with an analog circuit without the use of a phase-lock loop. In one embodiment, the analog circuit includes a low noise amplifier 56, a mixer 57, a LC oscillator 58, a variable gain amplifier 59 and a power amplifier 60. Other circuit arrangements are also contemplated by this disclosure. In some embodiments, the tag device 55 has a small form factor which can be easily carried by a person.

Transmission and reception occur concurrently at the anchor 41 and tag 55. In this example, the 2.4 GHz ISM band operation of the anchor allows up to 4 W transmit equivalent isotropically radiated power (EIRP). On the other hand, the returning signal power from the tag is much lower, ≤1 mW. This asymmetric power level is because of the FCC regulation (5000 μV/m@3 m at 900 MHz) and the low power constraint at the tag. The localization system 40 allows a mechanism to adjust the transmit power from the anchor 41 to limit the reflection power from the tag 55 at 900 MHz to be under the FCC limit. Although the returning signal power is low, the sub-GHz frequency signal penetrates walls better and experiences less multipath interference than higher frequency signals.

Operating with a modest bandwidth of ≤80 MHz, the proposed system specification can be easily met by many low cost commercial off-the-shelf (COTS) RF transceivers and software defined radios (SDRs), such as USRP for anchor prototyping. In addition, the need for synchronization is eliminated among anchors in this scheme, while many other localization systems require a common (i.e., cabled) frequency and/or time reference among anchors. In this example scheme, infrastructure anchors are rapidly deployable since ranging between an anchor and a tag can be performed independently without interaction among each other. In fact, making anchors rapidly deployable is very crucial in some applications, such as fire fighter location tracking. Time synchronization between a tag and an anchor is also unnecessary for the proposed localization system 30.

The FWCW waveform discussed herein has a fundamental limit in estimating ToF when the channel has severe multipaths. Each multipath signal has a different arrival time at the anchor, thus unequal beat frequencies of random phase and magnitude multipath signals are mixed together resulting in the inter-carrier interference. Conventional FMCW systems use ultra-wide bandwidth to separate multiple beat frequencies in a high resolution. To efficiently eliminate inter-carrier interference from multipaths without an excessive bandwidth requirement, an OFDM based ranging signal is proposed, for example using the datapath shown in FIG. 5.

In the example embodiment, the transmitted OFDM symbol in frequency domain is defined by an N×1 complex valued vector X=[X[0], X [1], ..., X[N−1]], where X[n] is a complex valued constellation point for the subcarrier n, and N is the number of subcarriers in the signal bandwith (BW). The IFFT output of x is an N×1 complex valued vector x=[x[0], x[1], ..., x[N−1]], where x[n] is the time domain complex sample at the time index n with Nyquist sampling rate of 1/BW (complex valued signal). To mitigate the inter-symbol interference (ISI) from the multipath delay spread, a cyclic prefix (CP) guard interval is appended to each OFDM symbol. Note that the CP guard interval must be longer than the worst case delay spread from multipaths. The CP appended signal x is converted to the continuous time domain signal x(t) and then up-converted to 2.4 GHz for anchor transmission. This 2.4 GHz passband anchor transmit signal is denoted by $x_{A2T}(t)=x(t)e^{j2\pi f_{A2T}t}$, where $f_{A2T}$=2.4 GHz, as shown in FIG. 4.

Accurately estimating the distance from the anchor to the tag is the central objective of the proposed localization system 40. When the distance is d, the channel impulse response $h_{A2T}(t)$ from the anchor to the tag can be modeled, where $L_{A2T}$ is the number of multipaths, $\tau_0$=d/c is the one-way ToF of the RF signal to travel the distance d in the shortest path, and $h_{A2T,0}$ is the corresponding channel gain (complex valued). Other terms $h_{A2T,i}\delta(t-\tau_{A2T,i})$ from multipath reflections satisfying $\tau_{A2T,i}>\tau_0$ with i≥1. The shortest path channel gain could be much weaker than those of other multipaths, $|h_{A2T,0}|<<|h_{A2T,i}|$, i>0, especially in NLOS conditions. Estimating $\tau_0$ is our goal.

$$h_{A2T}(t) = h_{A2T,0}\delta(t-\tau_0) + \sum_{i=1}^{L_{A2T}} h_{A2T,i}\delta(t-\tau_{A2T,i}) \quad (4)$$

$$h_{T2A}(t) = h_{T2A,0}\delta(t-\tau_0) + \sum_{i=1}^{L_{A2T}} h_{T2A,i}\delta(t-\tau_{T2A,i})$$

Using $h_{A2T}(t)$, the received signal at the tag is denoted by $r_{tag}(t)=h_{A2T}(t)*x_{A2T}(t)+n_{tag}(t)$, where $n_{tag}(t)$ is noise added at the tag receiver front-end and the operator * stands for convolution. Active reflection is employed at the tag, where the received signal is frequency converted to 900 MHz band and sent back to the anchor in a full frequency duplex fashion. The reflected signal can be written as $x_{T2A}(t)=r_{tag}(t)e^{-2\pi f_{shift}t}$, where $f_{shift}=f_{A2T}-f_{T2A}$, and $f_{T2A}$=900 MHz. Here, the deterministic delay of the tag analog processing is ignored, which can be easily calibrated out at the anchor. The $x_{A2T}(t)$ reception and $x_{T2A}(t)$ transmission occur simultaneously at the tag (and at the anchor too). Unlike conventional digital systems, the active reflection tag employs all-analog processing as depicted in FIG. 4. This approach allows the anchor to estimate the ToF $\tau_0$ without ambiguity associated with the tag processing delay. The reflected signal $x_{T2A}(t)$ from the tag experiences channel impulse response $h_{T2A}(t)$ (4), which is different from $h_{A2T}(t)$ because of the carrier frequency difference. However, the short path ToF, $\tau_0$ is common for both $h_{A2T}(t)$ and $h_{T2A}(t)$ as indicated in (4). The anchor receiver performs frequency mixing by $e^{-j2\pi f_{T2A} t}$ to bring the signal back to baseband. The baseband received signal at the anchor, therefore, can be represented by $y(t)=h_{A2T}(t)*h_{T2A}(t)*x(t)+n_{anchor}(t)$, where $n_{anchor}(t)$ is the equivalent noise at the anchor. In the frequency domain, equation (5) below holds, where $Y(f)$, $H_{A2T}(f)$, $H_{T2A}(f)$, $X(f)$ and $n_{anchor}(f)$ are Fourier transform representations of $y(t)$, $h_{A2T}(t)$, $h_{T2A}(t)$, $x(t)$, and $n_{anchor}(t)$ respectively. Before further processing, the guard interval is removed from $y(t)$ to mitigate the ISI as in conventional OFDM systems.

$$Y(f)=H_{A2T}(f)H_{T2A}(f)X(f)+n_{anchor}(f) \quad (5)$$

Note that the baseband signal $x(t)$ and $y(t)$ are sampled simultaneously using the same local clock of the anchor. By taking FFT on Nyquist sampled $y(t)$, the frequency domain, received OFDM vector symbol $Y=[Y[0], Y[1], \text{fi}, Y[N-1]]$ is obtained. Based on equation (5), channel estimation $H_{est}$ in the frequency domain can be computed using equation (6). Unlike conventional FMCW, the method using OFDM does not suffer from inter-subcarrier interference in $H_{est}$ computation. That is, $$\frac{Y[j]}{X[j]}$$

can be computed without interference from $i \neq j$ subcarriers because of inherent orthogonality among subcarriers in OFDM signaling. The discrete time domain channel impulse response estimate $h_{est}=h[0],h[1], \ldots h[N-1]$ is obtained by taking IFFT on $H_{est}$. Note that $h_{est}$ is sampled at the rate of 1/BW. The proposed localization system obtains the ToF $\tau_0$ by analyzing the interpolated signal $h_{est}(t)$ of the discrete time channel impulse response such that $h_{est}(t)=h_{A2T}(t)*h_{T2A}(t) \approx \text{interpolation}(h_{est})$. $h_{est}(t)$ reveals the round-trip ToF $2\tau_0$, as illustrated in top-left of FIG. 5.

$$H_{est} = \left[ \frac{Y[0]}{X[0]}, \frac{Y[1]}{X[1]}, \ldots, \frac{Y[N-1]}{X[N-1]} \right] \quad (6)$$

The proposed active reflector based approach eliminates the need for time synchronization between the anchor 41 and tag 55. The active reflector in the tag 55 echoes the received signal to the anchor 41 with a deterministic delay. All-analog design of the tag 55 does not incur any sampling time ambiguity or sampling frequency offset that are inevitable in all discrete time based signal processing. Eliminating the notion of discretized time during the active reflection at the tag allows a tag design without a reference crystal to lower its manufacturing cost. Moreover, a carrier frequency offset (CFO) self-calibration scheme is proposed to eliminate the conventional phase-lock loop (PLL) for carrier frequency generation at the tag to further reduce its power consumption. Thus, the feasibility of a PLL-less and crystal-free tag design is demonstrated for extremely cost-sensitive low-power tags.

Figure 5:
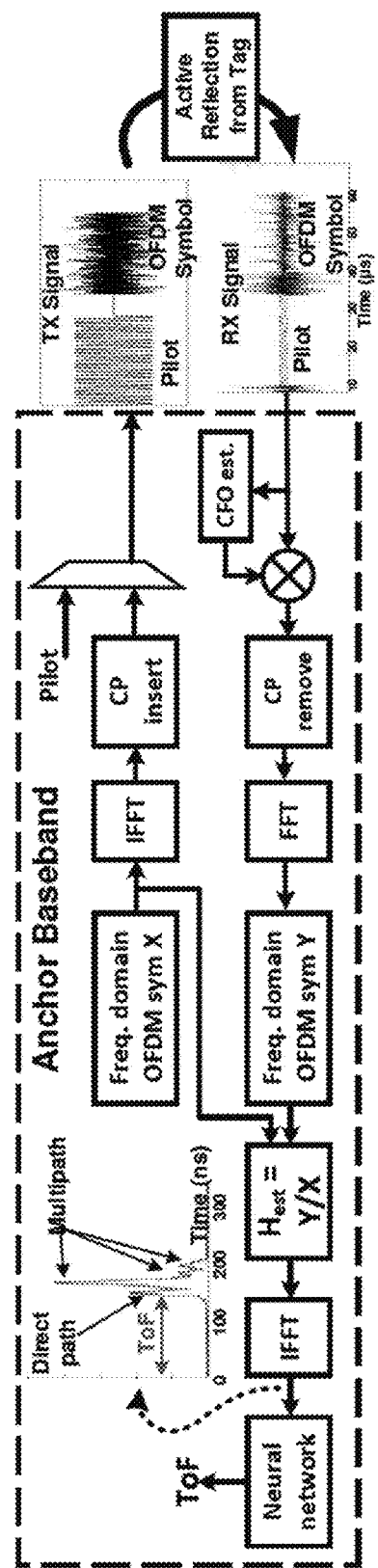
FIG. 5 is a block diagram of the localization system showing the OFDM based ToF estimation datapath.

In one embodiment, the proposed CFO self-calibration is performed by sending a pilot tone, $PA2T(t)=e^{j2\pi f_{pilot} t}$, before the OFDM signal $x(t)$ transmission (FIG. 5, right). Any frequency mismatch $f_{CFO}$ in the free-running LC oscillator (without a PLL) of the tag will alter the frequency of the received pilot signal (ignoring noise) to $PA2T^{(t)}(t)=e^{j2\pi(f_{pilot}-f_{CFO})t+j\Phi}$, where $\Phi$ is the random phase mismatch. The frequency offset is estimated at the anchor by the frequency of the mixed signal; $PA2T^{(t)pT2A}*(t)=e^{j\Phi}e^{j2\pi f_{CFO} t}$. The random phase offsett $\Phi$ can be ignored for ToF ranging. To validate this concept, the integrated circuit for the tag is fabricated employing a free-running LC-oscillator circuit without a PLL or a reference crystal clock for frequency ($f_{shift}$) generation.

In contrast to the conventional UWB time domain ToF estimation where >1 GHz bandwidth is required to achieve cm-scale accuracy, this approach uses a modest ≤80 MHz bandwidth OFDM signal and analyzes the reflected signal in the frequency domain to reconstruct the time-domain channel impulse response. This ≤80 MHz constraint is from the 2.4 GHz ISM band restriction. Nyquist sampling rate (=1/BW for a complex signal) of 80 MHz bandwidth signal indicates that the time resolution is only 12.5 ns. This is equivalent to 3.75 meter resolution for the RF signal that travels at the speed of light c, which would severely limit the accuracy of the ToF based ranging.

In the example embodiment, the accuracy limitation of this relatively low signal bandwidth of the proposed localization system 40 is overcome by a neural network based ToF estimator 54 employed at the anchor 41. While this disclosure describes a neural network approach, it is readily understood that other methods for computing the time-of-flight at the anchor are also contemplated by this disclosure.

Referring to FIG. 6, an example neural network has a fully connected feed-forward structure with two hidden layers. The neural network is trained with many (>500 k) multipath channel impulse response (CIR) training examples $h_{est}^{train}(t)=h_{A2T}^{train}(t)*h_{T2A}^{train}(t)$ that are synthesized (simulated) in Matlab. In other words, the neural network training does not necessarily require real-world channel impulse response dataset which is typically unavailable when the system is deployed in unknown environments. Extensive training dataset are generated using an ITU indoor channel model with exponential delay profiles, randomly generated multipath taps, and random delay spreads to cover various NLOS channel scenarios. Based on the simulated dataset, feed-forward network weights are trained using a back-propagation method. The neural network output is the confidence value that is (statistically) maximized when the input channel impulse response is well-aligned with the representative shape of the training dataset waveforms that are all centered at the ground-truth round-trip ToF. The training dataset $h_{est}^{train}(t)$ and the CIR estimation $h_{est}(t)$ signals are the interpolated (by a factor of >10×) version of the discrete time channel impulse response sampled at Nyquist rate. For neural network training and evaluation, one can use the dB representation of the signal amplitude $20 \log_{10}(|h_{est}^{train}(t)|)$ and $20 \log_{10}(|h_{est}(t)|)$, respectively.

The training signal $h_{est}^{train}(t)$ is trimmed for the time span $$t \in \left[ 2\tau_0 - \frac{T_{frame}}{2}, 2\tau_0 + \frac{T_{frame}}{2} \right],$$

which is centered around the ground-truth round-trip ToF $2\tau_0$. $T_{frame}$ is the training signal window size as shown in FIGS. 5 and 6. Note that the training signal window size is much shorter than the entire CIR time span because the neural network is only trained for the CIR shaped around the shortest ToF point. For ToF estimation, the estimated channel impulse response $h_{est}(t)$ is fed into the trained neural network in a sliding window fashion as shown in FIG. 6. When the sliding window position is τ, the $h_{est}(t)$ input window span is $$t \in \left[2\tau - \frac{T_{frame}}{2}, 2\tau + \frac{T_{frame}}{2}\right]$$

and the neural network evaluates if this windowed signal resembles the training dataset. The neural network output is (statistically) maximized when τ is the same as the ground-truth ToF $2_{\tau_0}$, illustrated in FIG. 7.

To further improve the accuracy of the neural network based ToF estimation, one can apply the bootstrap aggregating method. The idea is to train the neural network with several different models separately, then have all the models vote on the output to accurately estimate ToF from the $h_{est}(t)$ signal. In this proposed solution, the neural network is trained not only with the training signal that is centered around the ground-truth $2_{\tau_0}$ (i.e., on-time dataset) but also with other (independently generated) training dataset with a time offset $\tau_{offset}$ in ToF. The training dataset with the early and late offset has the signal span of $$\left[2_{\tau_0} - \tau_{offset} + \frac{T_{frame}}{2}, 2_{\tau_0} - \tau_{offset} + \frac{T_{frame}}{2}\right] \text{ and}$$
$$\left[2_{\tau_0} - \tau_{offset} - \frac{T_{frame}}{2}, 2_{\tau_0} - \tau_{offset} + \frac{T_{frame}}{2}\right],$$

respectively as depicted in FIG. 7. As the sliding window position τ of the neural network input $h_{est}(t)$ changes from 0 to the maximum ToF, the neuron trained with early offset would generate a high confidence output first. As the slide window position τ passes by $2_{\tau_0}$ and $2_{\tau_0} + \tau_{offset}$, we expect to observe a high confidence output sequentially from the on-time trained neuron and then from the late offset neuron. By combining these three confidence outputs with proper time delays, the accuracy of ToF estimate significantly improves compared to the case with on-time training dataset only.

FIGS. 8A-8C show the accuracy improvement from the proposed neural network algorithm compared to a hand-designed baseline algorithm. In the baseline algorithm, ToF is estimated by the timing when the power of the sample exceeds a dynamically set threshold level that is proportional to the first peak level in the channel impulse response. The threshold of the baseline algorithm is optimized over an extensive dataset for fair comparison. The Matlab simulation results in FIGS. 8A and 8B confirm that, in a challenging 50 m NLOS scenario, the neural network algorithm (error standard deviation $e_{std}$=1.45 m) outperforms the baseline ($e_{std}$=2.09 m). This result is from the single 20 μlong OFDM symbol based ranging. The ranging accuracy of the neural network algorithm is further improved by the confidence-weighted symbol combining technique discussed herein.

The operating range target of localization system is up to 100 m, which exceeds the typical operating range of popular ISM band communication standards, such as WiFi. The operating range is constrained by the FCC regulation that limits the RF power transmission to be under 4W EIRP for 2.4 GHz ISM band and <5000 μV/m @ 3 m for the 900 MHz returning path. The tag ASIC maximum transmit power is limited to 0 dBm (1 mW). Although the 80 MHz bandwidth is significantly lower than that of UWB radios, it is still 4× wider than the legacy WiFi specification. Enhancing SNR for 80 MHz operation is critical to achieve≈100 m range in indoor scenarios.

For the localization system, the complicated band-stitching technique can be replaced by a simple coherent signal combining of multiple OFDM symbols to enhance SNR. Although the tag and anchor are unsynchronized, a coherent channel estimation process is realized at the anchor by the self-phase aligned processing. That is, both transmit and receive signals are sampled using the same local anchor clock where the reflection delay of the tag is deterministic and constant. The frequency domain channel estimation from the i-th OFDM symbol can be represented by $H_{est,i}=H_{est}+n_i$ where $H_{est}$ is the true channel response and $n_i$ is the noise vector in frequency domain. As long as the channel is stationary for multiple consecutive OFDM symbols, combining K channel estimations from consecutive OFDM symbols would increase the effective SNR by a factor of K because channel estimation from multiple measurement would add consecutively (due to the self-phase aligned coherent channel estimation) while the independent noises are combined incoherently;

$$\sum \frac{K}{i=1} H_{est,i} = KH_{est} + \sum_{i=1}^{K} n_1.$$

That is, $\|KH_{est}\|^2/2=K^2\|H_{est}\|^2/2$ while $E(\|\Sigma_{i=1}^{K} n_1\|^2/2=KE\{\|n_1\|^2/2\}$. The OFDM symbol duration is in the order of 10s of μs. Therefore, combining ≤10 OFDM symbols per localization fix does not incur unacceptable delay, while it provides up to 10 Db SNR improvement.

It is also possible to combine multiple ToF estimates from the neural network output. A naive way of combining multiple ToF estimates is to use arithmetic averaging of estimated distances. The proposed neural network approach allows combining multiple ToF estimates by weighted combination using the confidence output of the final neuron. Since the activation function of the final layer of the neural network is the soft-max function, one can interpret the neural network output as the confidence weight associated with each ToF estimate. The simulation results in FIG. 8C show the comparison between arithmetic averaging and the weighted combining. It also shows the performance gain of the proposed bootstrap aggregation (using early, on-time and late neurons) compared to the conventional case where only on-time neuron is used. The standard deviation of 1D ranging error ($e_{std}$) is reduced (Matlab simulation results) from 1.45 m to <0.085 m by applying the confidence weighted combining of >6 OFDM symbols (20 μs each) in a 50 ns delay spread NLOS channel. The actual measurement data using the fabricated IC is presented herein.

The 2D or 3D coordinate of the tag is obtained by the multilateration process, which combines 1D ranging results from at least three anchors. It is the same process used by GPS geolocation. Given the distance estimate $d_j$ from the j-th anchor to the tag, the tag location coordinate estimate p* can be obtained by solving the optimization problem where $p_j^{anchor}$ is the known coordinate of the j-th anchor, and J is the number of anchors. The optimization problem can be generalized to 2D or 3D coordinate localization cases with at least three anchors.

$$p^* = \underset{p}{\operatorname{argmin}} \sum_{j=1}^{J} \left( \|P_j^{anchor} - p\|_2 - \hat{d}_j \right)^2 \quad (7)$$

The optimization problem above (7) is non-convex. However, it can be efficiently solved using methods known in the art. The accuracy of the multilateration is directly affected by the reliability of ID ranging performed at each individual anchor.

For the example embodiment, the proposed active reflector tag is fabricated in a CMOS 180 nm process technology. FIG. 9A is a schematic for an example LNA and mixer circuit for a reflector tag; whereas, FIG. 9B is a schematic of an example VGA and PA circuit for the reflector tag. The integrated circuit for the tag supports a gain dynamic range of 60 dB to adjust to the received signal strength at different distances. The frequency down conversion improves the pathloss of the return path (i.e., 900 MHz reflection rather than 2.4 GHz), which lessens the transmit burden at the low power reflector, while also solving the TX/RX self-interference issue for full duplex operation. The proposed asymmetric reflective architecture simplifies tag design by shifting all signal processing complexity to the anchor and eliminating the need for time synchronization between the anchor and the tag. The transmit power is also asymmetric between the anchor and tag. Given a gain setting at the tag, the anchor can adjust its transmit power so that the returning signal power from the tag at 900 MHz is under the FCC mask.

The integrated circuit for the tag is designed to support a >10 dB peak-to-average-power ratio for an 80 MHz bandwidth OFDM signal with 15-60 dB of variable total gain. The transformer-based input matched LNA performs inherent single-ended to differential conversion, providing the doubled-balanced mixer input. This architecture is suitable for compact input matching for the 80 MHz bandwidth target. To minimize the power consumption and dimension on the tag, we eliminate the usage of a crystal oscillator and the phase-locked loop (PLL) for generating the shifting frequency ($f_{shift}$). Instead, it uses an LC-based free-running voltage controlled oscillator (VCO) as the local oscillator (LO) and a current-commuting mixer with transformer load. PLL-less LO generation enables low power design of the tag but it is inevitable to have an inherent carrier frequency offset (CFO) that is slowly drifting over time from the target frequency. We tackle this issue using the CFO estimation/compensation technique described herein. The pilot tone does not have to be inserted for every OFDM symbol as the CFO drifts slowly (at least in the order of millisecond) over time.

The transformer at the mixer output acts as a filter and a power combiner. The mixer is designed to directly drive the PA in the bypass mode with sufficient linearity. The variable gain amplifier (VGA) provides a high dynamic range and consists of 4 gain paths: high gain, mid gain, low gain, and bypass. Because of the required peak gain (60 dB) at 900 MHz and the limited on-chip area, an active inductor is used to boost the gain. The last stage is a single-ended class-AB PA with RC feedback to increase the linearity and stability.

By eliminating the off-chip crystal oscillator and PLL, the cost, complexity, and power consumption of the tag IC is significantly reduced. The measured power consumption of the tag IC is 62.8 mW when it operates with the maximum (60 dB) gain for active full-duplex reflection. With a 30 µs long ranging symbol (10 µs pilot plus a 20 µs OFDM symbol), the tag energy consumption per 1D ranging translates to 1.8 µsJ.

For the anchor prototype (FIG. 1), an USRP X310 with an SBX-120 RF card is used to enable the full duplex transmit and receive operation at the same time. The precise timing of the base-band OFDM transmit and receive signal sampling is controlled by a common 200 MHz main clock on the USRP FPGA. The global time stamp on the FPGA allows initiating both transmit and receive paths at the same time for the self-aligned time synchronization. The maximum OFDM signal bandwidth supported by the anchor prototype is 100 MHz. The baseband OFDM waveform generation, OFDM signal reception, pilot insertion, carrier frequency offset tracking, and neural network based post-processing are all performed on a laptop running GNU Radio and Matlab software.

The 2D or 3D localization requires multiple anchors operating in a time multiplexed fashion. The accurate time synchronization among anchors, however, is not required as long as the ranging OFDM signal does not collide during the shared medium access. Each anchor can operate with a simple carrier sensing collision avoidance scheme for the medium access control. Accurate carrier frequency synchronization among anchors is also unnecessary. Any carrier frequency offset between an anchor and a tag will be resolved locally at each anchor. Without need for accurate synchronization, anchors are rapidly deployable by simply pulling them into outlets. The 1D ranging between an anchor and a tag can be performed independently without interaction among each other. The 2D/3D localization coordinate of the target tag is established by sharing 1D ranging results among anchors and performing the multilateration process.

Figure 3B:
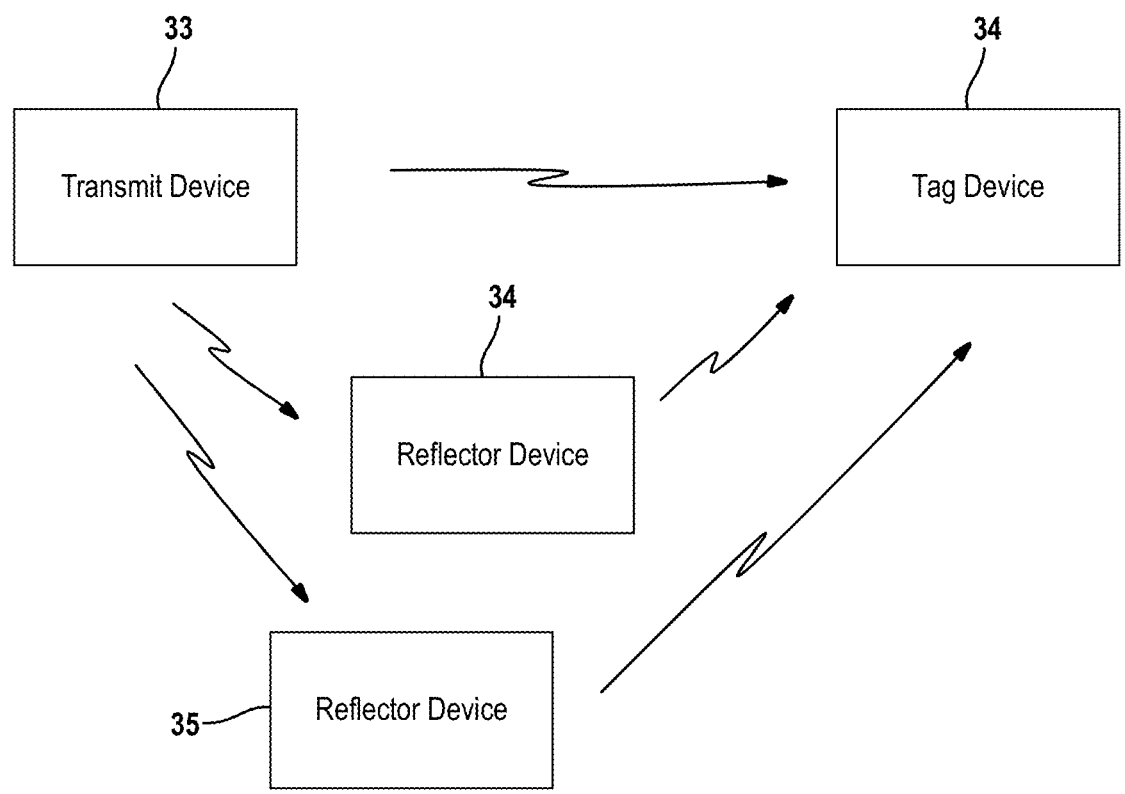
FIG. 3B is a diagram depicting a second embodiment of the proposed localization system

In a second embodiment, the transmitting device 33 is a different device from the localizing (or tag) device 36 as seen in FIG. 3B. The transmitting device 33 is configured to transmit an RF ranging signal at a first carrier frequency across a wireless medium, such that the RF ranging signal is modulated with a symbol. In addition to the transmitting device, two or more reflecting devices 34, 35 are needed to reflect the RF ranging signal to the localizing device. More specifically, the first reflecting device 34 is configured to receive the RF ranging signal from the transmitting device, convert the RF ranging signal to a first retransmit carrier frequency and retransmit the converted ranging signal across the wireless medium. Likewise, the second reflecting device 35 is configured to receive the RF ranging signal from the transmitting device, convert the RF ranging signal to a second retransmit carrier frequency and retransmit the converted ranging signal across the wireless medium.

To localize, the tag device 36 receives the RF ranging signal directly from the transmitting device and receives the converted ranging signals from the first reflecting device and the second reflecting device. The tag device 36 in turn determines its position from the RF ranging signal and the converted ranging signals using multilateration as further described below.

Operating principles for this second embodiment of a proposed localization system is further described in relation to FIG. 10. Active reflector anchors are located at known positions (e.g., outside of a building where GPS is reliable), and they perform frequency down-converting reflections from 5.8 GHz to 2.4 GHz to superimpose multipath echo signals in an OFDMA fashion. The down-conversion frequency of each active reflector is strategically chosen so that echoed signals arriving at each mobile tag are orthogonally combined without inter-symbol interference (ISI) and inter-carrier interference (ICI). This OFDMA echo scheme allows accurate TDoA estimation in multipath-rich NLOS indoor or urban canyons where GPS fails to reliably operate. As reflector anchors echo the same original signal without modification (except for frequency conversion), each mobile tag can analyze the channel impulse response (CIR) for each individual anchor by isolating multipaths from different anchors as illustrated in FIG. 10. The TDoA obtained from the CIR (see FIG. 10, bottom right) reveals the relative distance from the tag to each reflector anchor, while the coordinate of each anchor is encoded and modulated in the original packet from the main anchor. The location of each tag is identified by the trilateration process that combines TDoA estimates and known anchor coordinates. This localization system is scalable to an indefinite number of mobile tags in the network as localization is performed independently and simultaneously at each tag by analyzing the TDoA between the direct signal from the main anchor and echoes from active reflectors. In this example, the system utilizes 80 MHz bandwidth in both 5.8 GHz and 2.4 GHz ISM bands, allowing low latency message broadcasting in the order of tens of µs for the entire packet. Inherent frequency diversity gain from multiple echoes significantly enhances the reliability of mission-critical public safety broadcast messages. Again, although reference is made to particular frequencies, it is readily understood that the proposed ranging method is applicable to other frequencies as well.

Two separate channels in 5.8 GHz and 2.4 GHz ISM bands are utilized for inter-anchor and anchor-tag communications respectively. The former is used to exchange messages between anchors (infrastructure channel) while the later (service channel) is used for inter-tag or anchor-to-tag downlink data communication as well as tag localization services. It is envisioned that any anchor device can act as a main anchor or a reflector. The anchor role negotiation and anchor coordinate exchange are performed by inter-anchor communication using the 5.8 GHz channel.

Unlike GPS where satellites are accurately time-synchronized (1 ns offset leads to ≈30 cm ranging error) to send ranging packets at the exact timing, this localization system does not require strict time synchronization among anchors. Thus anchors can be realized on a low cost mobile platform (e.g., drones) as long as the coordinate of the anchor is accurately updated in real-time. The strict time synchronization requirement is eliminated because reflector anchors transparently echo the original signal without additional signal processing that may cause timing ambiguity. The active reflector can be realized by all-analog processing for the frequency conversion and full-duplex operation (i.e., simultaneous TX and RX) with a deterministic delay that can be easily cancelled out at the tag. Eliminating the accurate time synchronization requirement is particularly important as it significantly reduces the design cost of the active reflector and allows rapid deployment of mobile anchors as long as the coordinates of these units are known.

The main anchor broadcasts a subcarrier-sparse OFDMA signal using both 5.8 GHz and 2.4 GHz channels concurrently. At the same time, reflector anchors echo the 5.8 GHz signal with a carrier frequency down-conversion to 2.4 GHz with the OFDMA subcarrier mapping shown in FIG. 11. This frequency shift enables the reflector full-duplex transmission and reception with minimal self-interference. The received $x_m(t)$ and the reflected signal $y_m(t)$ at the $m_{th}$ reflector anchor have the relationship (1), where $f_m^{shift}$ is the frequency shift amount for the $m_{th}$ reflector (≈5.8 GHz−2.4 GHz=3.4 GHz), $\varphi_m$ is a constant but unknown phase rotation, $G_m$ is the signal gain of active reflection, is a constant deterministic delay of reflection, and $n_m(t)$ is the additive white Gaussian noise.

$$y_m(t) = G_m e^{-j(2\pi f_m^{shift} t + \varphi_m)} x_m(t - \tau_{echo}) + n_m(t) \qquad (8)$$

Multiple reflector anchors are configured with distinct frequency shift amounts satisfying $f_i^{shift} - f_j^{shift} = (i-j)/T_{sym}$ so that the reflected signals are orthogonally combined in-the-air forming an OFDMA waveform without ICI and ISI when the cyclic prefix guard interval [14] is used. $T_{sym}$ is the OFDMA symbol length.

Each tag listens to the 2.4 GHz channel to detect a valid packet from anchors. Once a valid packet is detected, each tag starts analyzing the CIR for each individual anchor path and then demodulate information bits exploiting a significant diversity gain from multiple reflectors. The demodulated information is then fed back to enhance the quality of the CIR estimation for the TDoA calculation. Each tag calculates its own 3D position by combining the estimated TDoAs and anchors' coordinates contained in the received packet.

The orthogonality of subcarriers and usage of the guard interval allow OFDM systems to estimate the CIR through simple subcarrier-wise division without ICI/ISI. Unlike prior OFDM based systems, the main anchor in this system generates an OFDMA signal with interleaved subcarriers and zero padding as shown in FIG. 11. Each reflector anchor is configured with a distinct $f_m^{shift}$ so that the reflected signal occupies an interleaved subset of subcarriers that are orthogonal to reflections from the other anchors. Interleaved subcarrier allocation is critical for the accuracy of the localization as it allows each reflector to concurrently utilize the almost full bandwidth of 80 MHz instead of dividing the entire bandwidth into smaller subbands for each reflector or applying time-division multiple access (TDMA) from multiple anchors as in prior systems. The effective bandwidth for the localization is dictated by the spacing between the lowest and the highest subcarrier frequency while the wider bandwidth results in a finer localization resolution. The proposed localization system utilizes the full 80 MHz available in the 2.4 GHz/5.8 GHz ISM band. Note that this bandwidth is substantially narrower compared to UWB (≥1 GHz) based systems.

The carrier frequency offset (CFO) affects the performance of OFDM systems as it can invalidate the orthogonality between subcarriers. The CFO estimation and correction (in the order of a few kHz) among anchors is a relatively simple problem compared to sub-nano-second timing synchronization among distributed nodes. The proposed localization system was prototyped using commercial off-the-shelf USRP software-defined radio (SDR). It was observed that the CFO is negligible (<10 kHz) without noticeable degradation of the localization accuracy. If needed, anchors can use the 5.8 GHz infrastructure channel for estimation and correction of CFOs among anchors.

As shown in FIG. 11, the entire 80 MHz bandwidth is divided into M groups, where M is the number of anchors. Each group contains N subcarriers, thus the total number of OFDMA subcarriers is MN. The parameters M and N can be adjusted depending on the number of anchors and the maximum operable range of the proposed localization system. The main anchor always occupies the first subcarrier group (m=0).

For example, the 80 MHz bandwidth can be divided into M=4 groups (i.e., 4 anchors including the main) with N=128 subcarriers per group (anchor), resulting in a 156.25 KHz spacing for the total 512 subcarriers. Among 128 subcarriers for each group, the two around DC are set to 'null'. The other 126 are data/pilot subcarriers modulated with quadrature amplitude modulation (QAM) or binary/quadrature phase shift keying (B/QPSK).

FIG. 12 shows the proposed iLPS packet structure adopted from the IEEE 802.11a/g/n WiFi. The preamble contains short training fields (STF, naming convention from the WiFi standard) for packet detection and the long training field (LTF) for the initial CIR estimation. The first two STF OFDMA symbols are designed to be identical except for the intentional constant phase rotation. Tags can detect valid packets by performing auto-correlation between two STF symbols and checking the phase relationship between them. The QAM symbols of the LTF are known to all tags to assist CIR estimation. The STF and LTF are followed by multiple data symbols conveying information bits. Each OFDM symbol requires a guard interval which has to be longer than the maximum delay spread of the multipath CIR. After successful demodulation of data symbols, the CIR for each anchor is updated combining multiple demodulated data symbols to improve the SNR of CIR estimation.

FIG. 13 depicts the overall datapath of the tag receiver to demodulate data symbols and to localize itself via TDoA estimation from the CIR analysis. Tags are not synchronized with the anchors. Thus, each tag needs to individually detect a packet that arrives at an arbitrary time. To do so, a valid packet with repeated STFs is detected by observing the peak magnitude and phase of the normalized auto-correlation output (9), where k is the sample time index, $A[k]=\Sigma_{i=0}^{MN-1} r[k+i]^* r[k+i+MN]$ is the auto-correlation, $P[k]=\Sigma_{i=0}^{2MN-1} |r[k+i]|^2$ is the signal energy, MN is the number of samples of one STF symbol and r[k] is the complex valued received sample. The intentional phase difference distinguishes STFs from the highly correlated interference signals caused by other non-iLPS transmitters or the DC offset of the receiver.

$$M[k]=A[k]/P[k] \quad (9)$$

Note that unlike other OFDM based localization systems, the exact timing of packet detection is irrelevant as long as it is detected within the uncorrupted guard interval. Because the system estimates the tag location based on the relative time difference of arrival from multiple anchors, the packet detection time ambiguity does not affect the localization result.

Let yLTF (t) denote the continuous LTF signal received at the tag. By taking FFT on Nyquist sampled yLTF (t), the received subcarrier QAM symbols Y[0], Y[1], . . . , Y[NM−1] are obtained. Among these, QAM symbols with indices Mn+m for n=0, 1, . . . , N−1 belong to the $m_{th}$ active reflector. (m=0) corresponds to the main anchor. When the noise is ignored, the relationship Y[Mn+m]=$H_m$[Mn+m]X[n] holds for n=0, 1, . . . , N−1 where $H_m$[k] is the channel frequency response (CFR) of the subcarrier k for the signal echoed by the $m_{th}$ reflector anchor, and X[n] is the nth frequency domain LTF QAM symbol transmitted by the main anchor. LTF QAM symbols X[n] are known to all tags to assist CFR estimation. Because of the interleaved subcarrier mapping shown in FIG. 11, X[n] is mapped on the subcarrier index Mn by the main anchor and echoed on mn+m,m>0, by reflectors. The CFR is obtained by simple element-wise division $H_m$[Mn+m]≈Y[Mn+m]/X[n].

CFR estimation from multiple LTF and/or data OFDM symbols can be coherently combined by simple addition to improve SNR and to enhance the estimation accuracy. It must be noted that there are M distinct sets of CFRs given by $H_m$[k] for (m=0), 1, . . . , M−1, and because of the interleaved subcarrier mapping, $H_m$[k] is undefined if k mod M≠m. In iLPS, these undefined $H_m$[k] are interpolated from adjacent available $H_m$[k] so that $H_m$[k] is fully populated for all k=0, 1, . . . , MN−1, regardless of m. The discrete time domain CIR $h_m[k_t]$ with the time sample index $k_t$, $k_t$=0, 1, . . . , MN−1 for the $m_{th}$ reflector is obtained by taking inverse FFT (IFFT) on CFR $H_m[k_f]$, $k_f$=0, 1, . . . , MN−1.

As shown in the bottom right of FIG. 10, the rising edge of these M time domain CIRs denoted by $h_m$[k] or $h_m$(t) indicates the time-of-arrival (ToA) of the shortest path (direct path through blocking objects in NLOS). Later arriving impulses in the CIR are from multipaths. The time difference of CIR rising edges reveals the time-difference-of-arrival (TDoA) among M−1 reflector anchors and the main anchor. The TDoA between the main anchor and $m_{th}$ reflector anchor is denoted by $\hat{t}_m$. The distance difference $\hat{d}_m$, from the tag to the main and $m_{th}$ reflector is obtained by the relationship (10) where c is the speed of light. It is assumed c is a constant (using the speed in air) regardless of the medium the signal penetrates through.

$$\hat{d}_m = c\hat{t}_m \quad (10)$$

The main anchor transmits N data/pilot QAM symbols Q[n] mapped on OFDMA subcarrier indices Mn, n=0, 1, . . . N−1. The frequency domain received samples can be written as Y[Mn+m]=H[Mn+m]Q[n]+n[Mn+m] where n[k] is the additive white Gaussian noise sample. For a single QAM symbol Q[n], the tag receives M different versions Y[Mn+m], m=0, 1, . . . , M−1 from the main anchor and multiple reflectors. This is equivalent to a distributed M×1 multiple-input single-output (MISO) system when the tag employs a single receive antenna. For a scalar QAM symbol Q dropping the index n, the MISO signal model can be written as (11), where Y=$[Y[0], Y[1], \ldots , Y[M-1]]^T$ is the M×1 frequency domain received signal vector, H=$[H_0[0], H_1[1], \ldots , H_{M-1}[M-1]]^T$ is the M×1 CFR vector, and n is the M×1 AWGN vector.

$$Y = HQ + n \quad (11)$$

In the second embodiment of the localization system, data symbols are protected by the WiFi standard rate ½ convolutional code. To fully exploit the forward error correction (FEC) capability, the tag receiver produces soft decision log-likelihood ratio (LLR) outputs from the maximum likelihood (ML) MISO detection given by equation (12), where b is the binary data bit, $\sigma_{N_o}^2$ is the noise power, $\mathbb{Q}_d$ denotes the set of QAM symbols satisfying b=d ε 0, 1.

$$L(b) = -\frac{1}{\sigma_{N_0}^2}\{\min_{Q \in \mathbb{Q}_0}\|Y-HQ\|^2 - \min_{Q \in \mathbb{Q}_1}\|Y-HQ\|^2\} \quad (12)$$

The data demodulation reliability of a tag is significantly improved by the distributed MISO compared to the peer-to-peer communication between a single anchor and tag pair.

Once all data symbols are demodulated and soft-LLR (12) Viterbi decoding is performed for error correction, data validity is confirmed by performing the cyclic redundancy check (CRC). Error-free data symbols are then fed back to the CIR estimator to obtain additional CIRs $h_m^{(s)}$[k] from the valid $s_{th}$ data OFDMA symbol (s=0 corresponds to LTF). Therefore, tags can obtain multiple CIR estimates $h_m^{(s)}$[k], s=0, 1, 2, . . . , S−1, from SOFDMA symbols contained in a single error-free packet. We propose two possible ways of combining multiple CIR estimates from a single packet: 1) coherently combining CIRs before TDoA estimation to improve the SNR for the CIR estimation;

$$h_m[k] = \frac{1}{S}\sum_{s=0}^{S-1} h_m^{(s)}[k],$$

and 2) weighted median filtering of TDoA outputs computed from each individual CIR $h_m^{(s)}[k]$. The former method is referred as the pre-TDoA combining and the later as post-TDoA combining. Depending on the SNR of the received signal, it is possible to optimally mix two approaches such that, out of the total $S=S_{pre} \times S_{post}$ CIR estimates, $S_{pre}$ CIRs are pre-TDoA combined and $S_{post}$ pre-combined results are post-TDoA combined. Details of the neural network assisted TDoA estimation are discussed below and the effect of various CIR combining strategies is also analyzed below.

The channel model used in iLPS is represented by equation (13), where $h_m(t)$ is the continuous CIR for the channel through the $m_{th}$ active reflector and $\tau_{m,i}$ is the ToA of the impulse on the $i_{th}$ multipath through the $m_{th}$ active reflector. i=0 indicates the shortest direct path through blocking objects in NLOS channels. Note that the condition $|h_{m,0}| \ll |h_{m,i \neq 0}|$ may frequently occur in realistic channels.

$$h_m(t) = \sum_{i=0,1,\ldots} h_{m,i} \delta(t - \tau_{m,i}) \quad (13)$$

In this second embodiment, $h_m(t)$ is obtained by interpolating the discrete CIR estimate $h_m(k)$ with a lowpass interpolating filter. The TDoA $\hat{t}_m$ between the main anchor and the $m_{th}$ reflector is computed by equation (14), and it reveals the distance difference $\hat{d}_m$ from the tag to the main and $m_{th}$ reflector given by equation (10).

$$\hat{t}_m = \tau_{0,0} - \tau_{m,0} \quad (14)$$

In contrast to UWB ToA estimation where ≥1 GHz bandwidth is typically utilized to achieve decimeter-level accuracy, the second embodiment of the localization system occupies only 80 MHz bandwidth allowed for the 2.4 GHz/5.8 GHz ISM band. The Nyquist sampling rate (=1/bandwidth for a complex signal) of 80 MHz bandwidth indicates the time resolution of 12.5 ns. It is equivalent to 3.75 meter ranging distance resolution given the speed of light c, which would severely limit the accuracy of the narrow bandwidth ranging estimation.

The limited bandwidth for practical RF localization systems has led to the use of super-resolution techniques to determine the ToA/TDoA. Classical methods include Prony's polynomial method, the multiple signal classification (MUSIC) algorithm, and the matrix pencil method. Prony's method is able to find the paths exactly from 2k samples if there are k paths. However, root-finding for polynomials becomes difficult if k is large and the algorithm can be unstable in the presence of noise. While the MUSIC and matrix pencil method are more robust to noise, they require the prior knowledge of the number of paths, which is not available in general without additional estimation steps. A pattern matching method that finds the timing of the leading edge from the observed CIR is also considered. It outperforms the MUSIC and matrix pencil method without the knowledge of number of paths. In the first embodiment described above, a more powerful neural network based pattern matching with a bootstrap aggregating method was introduced to identify the timing of the rising edge of the time domain CIR (i.e., $\tau_{m,0}$ in (13)), demonstrating the feasibility of decimeter-level accuracy from a relatively narrow bandwidth of ≤100 MHz.

ToA estimation from the discrete CIR $h_m[k]$ is based on a neural network method as described above with a couple of modifications. First, a frequency domain kaiser window function with β=3 is applied to $H_m[k]$ before IFFT to reduce the time domain sidelobes in $h_m[t]$ or $h_m[k]$. Second, the sliding window for the neural network input is made asymmetric with respect to the groundtruth timing ($\tau_{m,0}$) to include more samples arriving before the rising edge. These modifications noticeably improve the robustness of the TDoA estimation. The neural network in in the second embodiment is trained to produce the maximum confidence (softmax) output when the ground-truth $\tau_{m,0}$ is exactly aligned at the ⅔ of the total length of the neural network input vector. The discrete $|h_m[k]|^2$ is first converted to log-scale and then interpolated by a factor of 10 to be fed into the neural network in a sliding window fashion. In one example, the input size is 81 samples and the neural network consists of two fully connected layers whose sizes are 81×32 and 32×16 with sigmoid and softmax activation function, respectively. An example neural network output confidence plot overlaid with a time domain CIR is shown in FIG. 14, which is captured from an actual field trial. The packet detection timing of the tag is not necessarily accurate or synchronized to the time reference of the anchor, thus the ToA obtained by system would contain an unknown time offset. This offset does not affect the final ranging/localization output because the proposed TDoA approach cancels out the common ToA estimation offset for multiple anchors.

The neural network training is performed using random multipath channel instances. Mutipath taps exhibit an exponential decaying power profile with independent Rayleigh fading for each tap. The RMS delay spread for the training was randomly varied from 10 ns to 100 ns.

The 2D or 3D coordinate of the tag is obtained by a multilateration process that combines TDoA estimates. Each TDoA generates a hyperboloid estimate of the tag position, and the intersection of these hyperboloids reveals the probable tag position. It is known as the hyperbolic location problem, which has been long studied with efficient solutions. For the second embodiment, one can formulate a non-linear optimization problem (15) below, where $p_m$ denotes the coordinate of anchor m, and solve it using an off-the-shelf non-linear programming solver (such as MATLAB 'fminconv').

$$p^* = \underset{p}{\operatorname{argmin}} \sum_{m=1}^{M} (\|p_m - p\|_2 - \|p_0 - p\|_2 - \hat{t}_m c)^2 \quad (15)$$

Once the coordinate of the tag is estimated, its real-time movement and trajectory are refined via a standard Kalman filter as in typical GPS systems. The latency of the system to obtain a location fix is in the order of ten of μs, which is at least 10× faster than that of GPS. This significantly faster refresh rate enables much accurate and more precise tracking of a tag.

Simulation results for the second embodiment of the localization system are shown in FIG. 15-18. All simulations adopt the multipath channel model (13) with exponential-decaying independent Rayleigh fading taps with uniformly random RMS delay spread from 10 ns to 80 ns. NLOS conditions are emulated by Rayleigh fading of the direct path tap, which can be significantly weaker than later arriving multipath taps. For the 1D ranging, the reflector anchor is placed 100 m away from the main anchor while the tag position is changed along the direct line between two anchors. Total 512 subcarriers are used with M=2 and N=256 for 1D ranging simulations. With the 80 MHz bandwidth and the guard interval length of 2 μs, each OFDMA symbol is 6.4 μs long.

The effect of pre- and post-TDoA combining on 1D ranging is shown in FIG. 15 and FIG. 16, respectively. By pre-combining $S_{pre}$ consecutive OFDMA symbols, the effective SNR is increased by a factor of $S_{pre}$ because the signal is coherently combined while the noise is not. FIG. 15 shows this linear SNR gain of pre-TDoA CIR combining (without any post-TDoA combining). The system can operate at a negative SNR when a sufficient number of OFDMA symbols are combined.

The post-TDoA combining is performed by applying weighted median filtering (WMF) on TDoA estimates from multiple (pre-TDoA combined) OFDMA symbols. The softmax confidence output of the neural network is used as a weight for the WMF. FIG. 16 shows the cumulative distribution function (CDF) of the 1D ranging error for different numbers of post-TDoA combined OFDMA symbols. As expected, post-TDoA combining monotonically improves the ranging accuracy. With 20 symbols combining, the median error of iLPS converges to ≈20 cm in this simulation setup.

The 3D localization and tracking simulation result is shown in FIG. 17. Eight anchors are placed at the corners of the 50×50×50 m cube. The tag moves along a Helix pattern with a constant speed of 88 cm/s. Two different OFDMA symbol rates of 3 sym/s and 60 sym/s are tested applying 3-symbol pre-TDoA combining to both rates while 20-symbol post-TDoA combining is only applied to the 60 sym/s scenario. FIG. 17 only shows the 60 sym/s scenario. Note that both of these symbol rates correspond to very infrequent OFDMA packet transmission scenarios. The simulated raw 3D ranging error without Kalman filtering is 2.8 m and 0.39 m for 3 sym/s and 20 sym/s scenarios, respectively. The average error reduces to 1.78 m and 0.19 m respectively with Kalman filtering.

One of main advantages of the second embodiment of the localization system is that it enables concurrent data broadcast communication together with localization sharing the same OFDMA packet. Moreover, the usage of multiple reflector anchors enables a distributed MISO diversity gain to significantly enhance the reliability of data communication for mission-critical public safety applications.

FIG. 18 shows the BER as a function of SNR assuming all paths from multiple anchors have the same average SNR while each of them experiences an independent multipath channel (13). The delay spread for this simulation is set to 50 ns and the transmit power of an anchor is scaled to 1/M when the total number of anchors is M The BER is measured after the FEC with a soft-LLR based Viterbi decoder. The total number of QPSK-mapped subcarriers is 104, which correspond to 24.8 Mbps with 80 MHz bandwidth and 8.4 μs symbol rate. As expected, the BER improves monotonically with the number of total anchors used in the system.

The prototype system is realized on the USRP X310 SDR with UBX-160 RF cards. The anchor USRP is equipped with two RF cards to enable the full duplex transmit and receive operation at the same time. An external power amplifier and low noise amplifier are used to amplify the signal for the active reflection and tag reception. The all-analog active reflection at the anchor is realized by directly connecting the analog-to-digital converter output of the receiver to the digital-to-analog converter of the transmitter. Different carrier frequencies are programmed for each active reflector transmitter and receiver analog frontend to realize the desired frequency down-conversion. Using two different band-pass antennas centered at 5.8 Hz and 2.4 GHz respectively reduces the self-interference for the full duplex reflector operation.

The tag realized on an USRP only requires a 2.4 GHz receiver. The real-time packet detection RTL is implemented and synthesized on the USRP FPGA while the rest of the baseband processing shown in FIG. 13 including neural network processing and Kalman filtering is performed in software. Software processing is performed only when a valid packet is detected.

FIG. 19 shows the prototype field trial result for 1D ranging in a multipath-rich atrium and long hallway of a large (up to 105 m for the longer dimension) university building. Each OFDMA symbol for 1D ranging contains 512 subcarriers with M=2 and N=256, resulting in the length of 8.4 μs per symbol including the guard interval. For each test point in FIG. 10a, 10 OFDMA symbols are post-TDoA combined (pre-TDoA combining is not necessary due to sufficient SNR). The standard deviation of the 1D ranging error is 17 cm and 10 cm with 1 and 10 post-TDoA combined symbols. With ≥90% probability, ≤20 cm 1D range error accuracy is measured with 10 symbols combining. FIG. 20 shows the LOS and NLOS 2D localization field trial results. With reference to FIG. 21, large classrooms are separated by thick concrete and bricks. The main and reflector anchors are denoted by stars and diamonds. The tested tag positions are marked as black circles. Both LOS and NLOS results are obtained by 20 symbols combining. Among multiple available anchors, only 4 of them are selected to compute each 2D tag localization measurement point in FIG. 20. The standard deviation of the 2D localization error is 19.41 cm and 28.45 cm for the LOS and NLOS case, respectively. The CDF of the 2D localization error is shown in FIG. 10b. With ≥50% probability, ≤26.9 cm and ≤50.6 cm 2D localization error accuracy is measured with for the LOS and NLOS case, respectively. It is worth noting that the accuracy of system is not a strong function of distance (given sufficient SNR) but it is affected by the orientation of tags vs. anchors and also by the channel fading conditions. The data communication BER is around $5 \times 10^{-4}$ for test points in FIG. 20 when reflector anchors are disabled (main anchor only), but no bit errors are detected when the MISO configuration is enabled.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for non-line-of-sight localization between RF enabled devices, comprising:
   a first transmitting device configured to transmit an RF ranging signal at a first carrier frequency across a wireless medium, where the RF ranging signal is modulated with a symbol; and
   a reflecting device configured to receive the RF ranging signal from the first transmitting device, wherein the reflecting device operates to convert the RF ranging signal to a first retransmit carrier frequency and retransmit the converted ranging signal across the wireless medium while simultaneously receiving the RF ranging signal, such that the first retransmit carrier frequency differs from the first carrier frequency;
   wherein the first transmitting device is further configured to receive the converted ranging signal from the reflecting device and compute a distance between the reflecting device and the first transmitting device by estimating time-of-flight of the ranging signal in frequency domain based in part on the symbol in the converted ranging signal;
   wherein the reflecting device down converts frequency of the RF ranging signal with an analog circuit, the analog circuit includes a mixer and an LC oscillator but excludes a phase lock loop circuit.

2. The system of claim 1 wherein the first transmitting node modulates the RF ranging signal using orthogonal frequency-division multiplexing (OFDM), such that the symbol is further defined as OFDM symbol.

3. The system of claim 1 wherein the first transmitting device computes the distance between the reflecting node and the first transmitting device by obtaining an impulse response of the converted ranging signal in the frequency domain and extracting the time-of-flight of the ranging signal from the impulse response.

4. The system of claim 3 wherein the first transmitting device extracts the time-of-flight of the ranging signal from the impulse response using a neural network.

5. The system of claim 1 wherein the first transmitting device transmits a pilot tone to the reflecting node and estimates a frequency offset between the first transmitting device and the reflecting device from the reflected pilot tone.

6. A system for non-line-of-sight localization between RF enabled devices, comprising:
   a first transmitting device configured to transmit an RF ranging signal at a first carrier frequency across a wireless medium, where the RF ranging signal is modulated with a symbol; and
   a reflecting device configured to receive the RF ranging signal from the first transmitting device, wherein the reflecting device operates to convert the RF ranging signal to a first retransmit carrier frequency and retransmit the converted ranging signal across the wireless medium while simultaneously receiving the RF ranging signal, such that the first retransmit carrier frequency differs from the first carrier frequency;
   wherein the first transmitting device is further configured to receive the converted ranging signal from the reflecting device and compute a distance between the reflecting device and the first transmitting device by estimating time-of-flight of the ranging signal in frequency domain based in part on the symbol in the converted ranging signal;
   a second transmitting device configured to transmit an RF ranging signal at a second carrier frequency across a wireless medium, where the RF ranging signal is modulated with a symbol; and
   a third transmitting device configured to transmit an RF ranging signal at a third carrier frequency across a wireless medium, where the RF ranging signal is modulated with a symbol;
   wherein the reflecting device is configured to receive the RF ranging signal from the second transmitting device and retransmits the RF ranging signal across the wireless medium using a second retransmit carrier frequency, such that the second retransmit carrier frequency differs from the second carrier frequency and the first retransmit carrier frequency; and
   wherein the reflecting device is configured to receive the RF ranging signal from the third transmitting device and retransmits the RF ranging signal across the wireless medium using a third retransmit carrier frequency, such that the third retransmit carrier frequency differs from the third carrier frequency, the first retransmit carrier frequency and the second retransmit carrier frequency.

7. The system of claim 6 further comprise a controller in data communication with first transmitting device, the second transmitting device, and the third transmitting device, wherein the controller estimates location of the reflecting device from the distance between the reflecting device and the first transmitting device, the distance between the reflecting device and the second transmitting device and the distance between the reflecting device and the third transmitting device.

8. A system for non-line-of-sight localization between RF enabled devices, comprising:
   a transmitting device configured to transmit an RF ranging signal at a first carrier frequency and at a second carrier frequency across a wireless medium, where the RF ranging signal is modulated with a symbol; and
   a first reflecting device configured to receive the RF ranging signal from the transmitting device at the first carrier frequency, wherein the first reflecting device operates to convert the RF ranging signal to a first retransmit carrier frequency and retransmit the converted ranging signal across the wireless medium;
   a second reflecting device configured to receive the RF ranging signal from the transmitting device at the first carrier frequency, wherein the second reflecting device operates to convert the RF ranging signal to a second retransmit carrier frequency and retransmit the converted ranging signal across the wireless medium;
   a third reflecting device configured to receive the RF ranging signal from the transmitting device at the first carrier frequency, wherein the second reflecting device operates to convert the RF ranging signal to a third retransmit carrier frequency and retransmit the converted ranging signal across the wireless medium; and
   a localizing device configured to receive the RF ranging signal directly from the transmitting device at the second carrier frequency and the converted ranging signal from the first, second, and third reflecting devices at the first, second, and third retransmit carrier frequencies, wherein the localizing device determines its position from the RF ranging signal and the converted ranging signals using multilateration.

9. The system of claim 8 wherein the transmitting node modulates the RF ranging signal using orthogonal frequency-division multiplexing (OFDM), such that the RF ranging signal includes an OFDM symbol.

10. The system of claim 9 wherein the RF ranging signal includes coordinates for the transmitting device, the first reflecting device, the second reflecting device, and the third reflecting device.

11. The system of claim 8 wherein the localizing device determines the position of the localizing device by computing time-difference-of-arrival between the RF ranging signal and the converted ranging signals.

12. The system of claim 11 wherein the localizing device computes time-difference-of-arrival by obtaining an impulse response of the RF ranging signal and the converted ranging signals in the frequency domain and extracting the time-difference-of-arrival from the impulse responses.

13. The system of claim 12 wherein the localizing device extracts the time-difference-of-arrival from the impulse responses using a neural network.

* * * * *